(12) United States Patent
Imada et al.

(10) Patent No.: US 12,296,643 B2
(45) Date of Patent: *May 13, 2025

(54) VEHICLE AIR CONDITIONING SYSTEM

(71) Applicant: DENSO CORPORATION, Kariya (JP)

(72) Inventors: Syun Imada, Kariya (JP); Kouji Miura, Kariya (JP); Masami Taniguchi, Kariya (JP); Daisuke Ota, Kariya (JP); Shinya Kaneura, Kariya (JP); Koichiro Shirai, Kariya (JP)

(73) Assignee: DENSO CORPORATION, Kariya (JP)

( * ) Notice: Subject to any disclaimer, the term of this patent is extended or adjusted under 35 U.S.C. 154(b) by 226 days.

This patent is subject to a terminal disclaimer.

(21) Appl. No.: 18/062,790

(22) Filed: Dec. 7, 2022

(65) Prior Publication Data

US 2023/0104697 A1 Apr. 6, 2023

Related U.S. Application Data

(63) Continuation of application No. PCT/JP2021/019435, filed on May 21, 2021.

(30) Foreign Application Priority Data

Jun. 12, 2020 (JP) .................................. 2020-102381

(51) Int. Cl.
*B60H 1/00* (2006.01)
*B60H 1/32* (2006.01)

(52) U.S. Cl.
CPC ......... *B60H 1/00371* (2013.01); *B60H 1/323* (2013.01); *B60H 2001/00949* (2013.01)

(58) Field of Classification Search
CPC ............ B60H 1/00371; B60H 1/00878; B60H 1/3227; B60H 1/323; B60H 2001/00307;
(Continued)

(56) References Cited

U.S. PATENT DOCUMENTS

2009/0320715 A1* 12/2009 Morita .................... B60L 50/64
105/51
2014/0260393 A1* 9/2014 Siddiqui ............ B60H 1/00364
62/410
(Continued)

FOREIGN PATENT DOCUMENTS

CA 3120040 A1 5/2020
DE 102016112089 A1 1/2018
(Continued)

OTHER PUBLICATIONS

U.S. Appl. No. 18/062,697, filed Dec. 7, 2022, Imada et al.

*Primary Examiner* — Kun Kai Ma
(74) *Attorney, Agent, or Firm* — Harness, Dickey & Pierce, P.L.C.

(57) ABSTRACT

A vehicle air conditioning system includes: air conditioners provided to respectively correspond to air conditioning zones; and a cooler that cools a target equipment mounted on a vehicle. The cooler includes a cooling circuit through which a heat medium for exchanging heat with the target equipment flows. Of the plurality of air conditioners, the air conditioner that air-conditions a door side zone is a door side air conditioner and the air conditioner that air-conditions a panel side zone is a panel side air conditioner. An amount of heat absorbed from the heat medium during an equipment temperature control, in which cooling of the interior and temperature control of the target equipment are respectively performed by the air conditioners, is smaller in the door side air conditioner than in the panel side air conditioner.

12 Claims, 22 Drawing Sheets

(58) Field of Classification Search
CPC ..... B60H 1/00278; B60H 1/247; B60L 50/60; B60L 2200/18; B60L 58/26; B60L 2240/34; B60L 2240/545; B60K 11/04
See application file for complete search history.

(56) References Cited

U.S. PATENT DOCUMENTS

| | | | |
|---|---|---|---|
| 2017/0021698 A1 | 1/2017 | Hatakeyama et al. | |
| 2020/0047583 A1 | 2/2020 | Ishizeki et al. | |
| 2020/0122544 A1 | 4/2020 | Ishizeki | |
| 2020/0171919 A1 | 6/2020 | Ishizeki et al. | |
| 2020/0331504 A1* | 10/2020 | Glinka | H01M 10/6568 |

FOREIGN PATENT DOCUMENTS

| | | | | |
|---|---|---|---|---|
| DE | 102017210052 A1 | | 12/2018 | |
| DE | 102018104301 A1 | | 8/2019 | |
| DE | 102018202142 A1 | | 8/2019 | |
| DE | 102018129337 A1 | | 5/2020 | |
| EP | 3367495 A1 | * | 8/2018 | ......... B60H 1/00207 |
| JP | 2004066889 A | * | 3/2004 | |
| JP | 2007-127304 A | | 5/2007 | |
| JP | 2009035232 A | | 2/2009 | |
| JP | 2015186989 A | | 10/2015 | |
| JP | 2016130047 A | * | 7/2016 | |
| JP | 2018177083 A | | 11/2018 | |
| JP | 2018184108 A | | 11/2018 | |
| JP | 2019023023 A | | 2/2019 | |
| JP | 2019130980 A | | 8/2019 | |
| JP | 2019146441 A | | 8/2019 | |
| JP | 2019169260 A | | 10/2019 | |
| KR | 101551140 B1 | * | 9/2015 | |
| WO | WO-2012164907 A1 | * | 12/2012 | .............. B60L 1/003 |
| WO | WO-2014045430 A1 | * | 3/2014 | ................ A62C 3/07 |

* cited by examiner

VEHICLE AIR CONDITIONING SYSTEM

CROSS REFERENCE TO RELATED APPLICATION

The present application is a continuation application of International Patent Application No. PCT/JP2021/019435 filed on May 21, 2021, which designated the U.S. and claims the benefit of priority from Japanese Patent Application No. 2020-102381 filed on Jun. 12, 2020. The entire disclosures of all of the above applications are incorporated herein by reference.

TECHNICAL FIELD

The present disclosure relates to a vehicle air conditioning system configured to condition air in a cabin.

BACKGROUND ART

An air conditioning system conditions air in a cabin of a vehicle and controls a temperature of a battery using a heat absorption action of a refrigerating cycle of an air conditioner.

SUMMARY

According to an aspect of the present disclosure, a vehicle air conditioning system includes: a plurality of air conditioners provided to respectively correspond to a plurality of air conditioning zones; and a cooler that cools a target equipment mounted on a vehicle. Each of the plurality of air conditioners includes a vapor compression refrigeration cycle, and cools air blowing out to the plurality of air conditioning zones by an endothermic action due to evaporation of a refrigerant. The cooler includes a cooling circuit through which a heat medium for exchanging heat with the target equipment flows, and adjusts a temperature of the target equipment by cooling the heat medium utilizing the endothermic action in at least a part of the plurality of air conditioners. When it is assumed that, of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during equipment temperature control, in which cooling of the interior and temperature control of the target equipment are respectively performed by the plurality of air conditioners, is smaller in the door side air conditioner than in the panel side air conditioner.

DESCRIPTION OF EMBODIMENT

Figure 1:
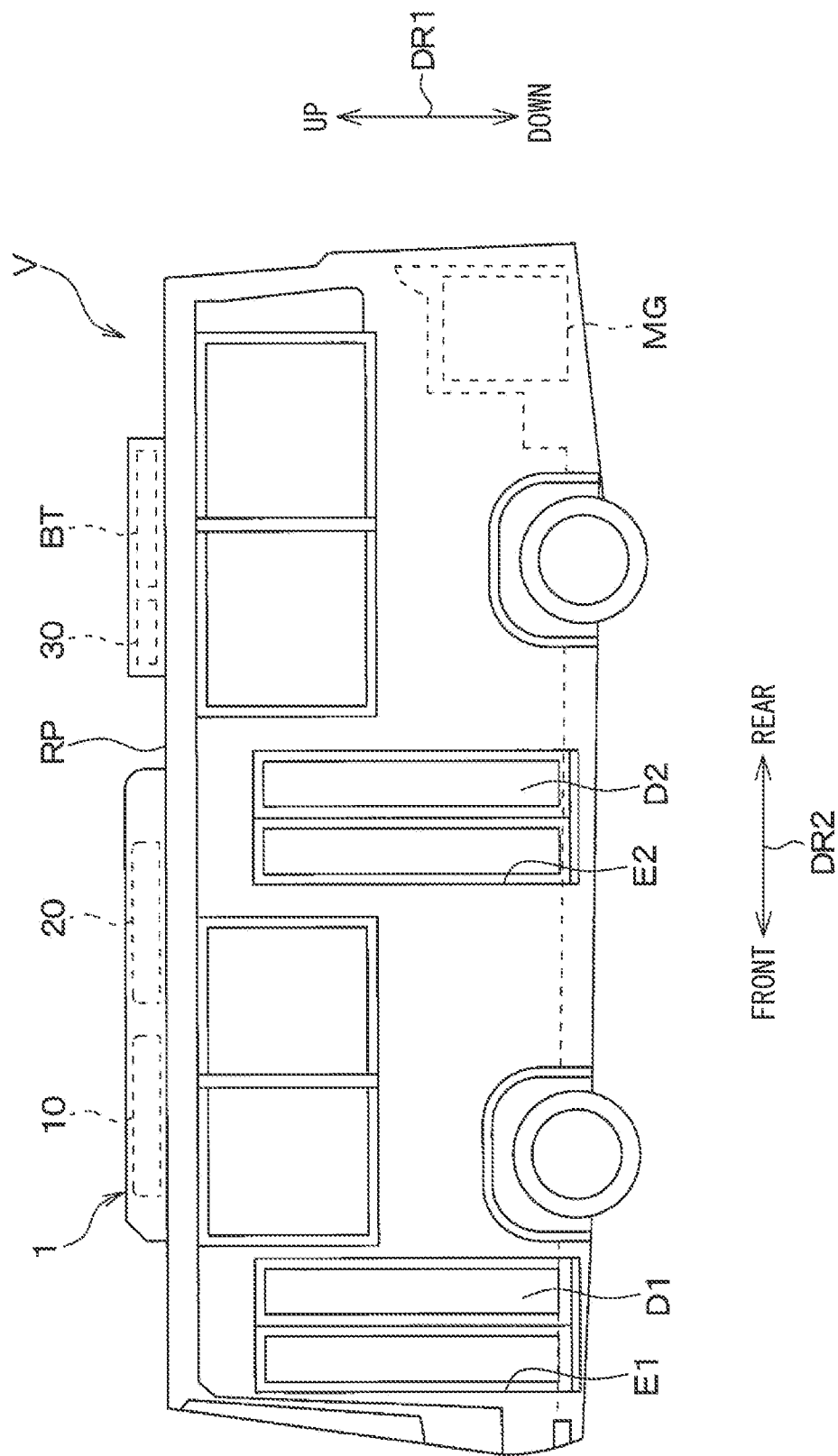
FIG. 1 is a schematic diagram of a bus vehicle to which an air conditioning system of a first embodiment is applied.

To begin with, examples of relevant techniques will be described. Conventionally, an air conditioning system is known, which conditions air in a cabin of a vehicle and controls a temperature of a battery using a heat absorption action of a refrigerating cycle of an air conditioner. In a vehicle air conditioning system that cools in-vehicle equipment by an air conditioner, the present inventors have studied dividing an interior into a plurality of air conditioning zones and performing air conditioning of the plurality of air conditioning zones by a plurality of air conditioners provided to respectively correspond to the plurality of air conditioning zones.

However, when each of the plurality of air conditioners cools the in-vehicle equipment, an amount of the heat absorbed from an interior by the plurality of air conditioners is limited due to the heat absorbed from the in-vehicle equipment. Therefore, comfort in the interior may not be ensured as expected. For example, in an air conditioning zone near a door of a vehicle, ventilation loss due to opening and closing of the door is more likely to occur than in an air conditioning zone away from the door of the vehicle. Therefore, when the amounts of the heat absorbed from the interior by the plurality of air conditioners are limited as the in-vehicle equipment are cooled, the temperature of the air conditioning zone near a door of a vehicle does not drop as expected, and the comfort in the interior decreases. These have been found as a result of intensive study by the present inventors. The present disclosure provides a vehicle air conditioning system including a plurality of air conditioners that perform air conditioning of an interior, for comfort in an air conditioning zone near a door of a vehicle even when target equipment is cooled.

According to an aspect of the present disclosure, a vehicle air conditioning system includes: a plurality of air conditioners provided to respectively correspond to a plurality of air conditioning zones; and a cooler that cools a target equipment mounted on a vehicle. Each of the plurality of air conditioners includes a vapor compression refrigeration cycle, and cools air blowing out to the plurality of air conditioning zones by an endothermic action due to evaporation of a refrigerant. The cooler includes a cooling circuit through which a heat medium for exchanging heat with the target equipment flows, and adjusts a temperature of the target equipment by cooling the heat medium utilizing the endothermic action in at least a part of the plurality of air conditioners. When it is assumed that, of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during equipment temperature control, in which cooling of the interior and temperature control of the target equipment are respectively performed by the plurality of air conditioners, is smaller in the door side air conditioner than in the panel side air conditioner.

According to this, an amount of the heat absorbed from a heat medium is suppressed during equipment temperature control in the door side air conditioner, so that an amount of the heat absorbed from the air blowing out to the door side zone increases. Therefore, even when target equipment is cooled, comfort in an air conditioning zone near a door of a vehicle can be ensured.

Here, the side panel is a panel constituting a side surface of the vehicle. Some vehicles are provided with an emergency exit for allowing a passenger to escape from the vehicle in an emergency and an opening and closing member for opening and closing the emergency exit. The opening and closing member for the emergency exit is always closed except in an emergency, and substantially constitutes the side surface of the vehicle. Therefore, in the present disclosure, the emergency exit and the opening and closing member constitute a part of the side panel. That is, the side panel of the vehicle provided with the emergency exit and the opening and closing member includes the emergency exit and the opening and closing member.

A reference numeral in parentheses attached to each component or the like indicates an example of correspondence between the component or the like and specific component or the like described in embodiments below.

Hereinafter, embodiments of the present disclosure will be described with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. The following embodiments may be partially combined with each other even if such a combination is not explicitly described as long as there is no disadvantage with respect to such a combination.

First Embodiment

The present embodiment will be described with reference to FIGS. 1 to 4. In the present embodiment, an example will be described in which the vehicle air conditioning system of the present disclosure is applied to an air conditioning system 1 of a bus vehicle V. In the arrows illustrated in FIGS. 1, 2, and the like, an arrow indicating up and down indicates an up-down direction DR1 of the bus vehicle V, an arrow indicating front and rear indicates a front-rear direction DR2 of the bus vehicle V, and an arrow indicating left and right indicates a width direction DR3 of the bus vehicle V.

Figure 2:
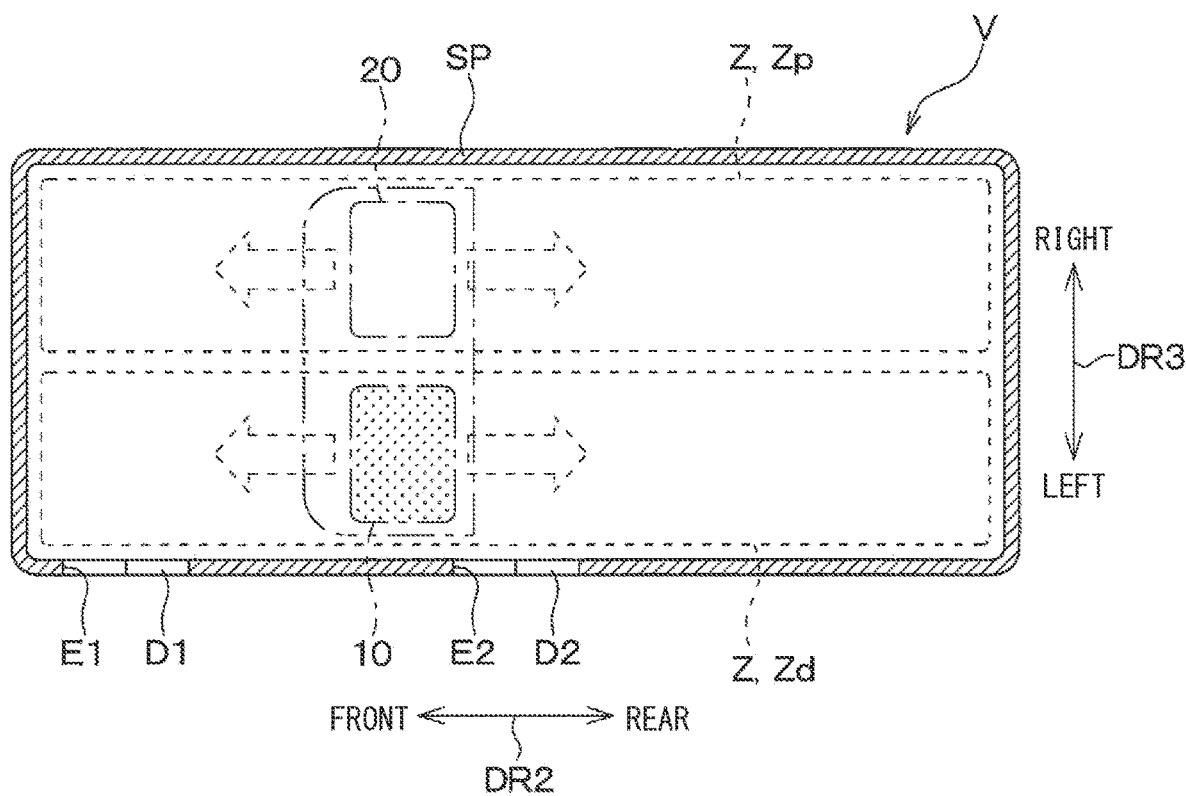
FIG. 2 is an explanatory diagram for explaining the bus vehicle to which the air conditioning system of the first embodiment is applied.

As illustrated in FIGS. 1 and 2, the bus vehicle V is provided with platforms E1 and E2 at two locations of a front portion and a center portion of a side surface on the left side in the width direction DR3. The platforms E1 and E2 are respectively provided with doors D1 and D2. The doors D1 and D2 are passenger doors that are opened and closed when a passenger gets on and off. Each of the doors D1 and D2 includes a folding door. Note that each of the doors D1 and D2 may include a hinged door, a sliding door, or the like.

The side surface on the right side, in the width direction DR3, of the bus vehicle V is not provided with the passenger door, and the entire of the side surface on the right side in the width direction DR3 is covered with a side panel SP. The side panel SP is a panel constituting the side surface of the bus vehicle V. As a result, it is possible to get on and off the bus vehicle V from the left side in the width direction DR3. Note that, in the present disclosure, a window, an opening and closing door for the emergency exit, and the like, which are set on the side surface of the bus vehicle V, constitute a part of the side panel SP.

The bus vehicle V is configured as an electric car that travels using electric energy as a drive source. The bus vehicle V is mounted with a traveling motor MG and a battery BT that stores electric power to be supplied to the traveling motor MG.

The battery BT includes a series connection body in which a plurality of battery cells that can be charged and discharged are electrically connected in series. Note that, in the battery BT, some of the plurality of battery cells may be connected in parallel.

The battery BT is connected to a non-illustrated power converter and the traveling motor MG. The power converter is, for example, a device that converts a direct current supplied from the battery BT into an alternating current and supplies the alternating current to various electric loads such as the traveling motor MG.

The battery BT is disposed in a ceiling portion of the bus vehicle V. Specifically, the battery BT is installed on a roof panel RP of the bus vehicle V. When the battery BT is disposed in the ceiling portion, a floor level in the bus vehicle V is reduced, and a passenger easily gets on and off the bus vehicle V.

The battery BT is heat generating equipment mounted on the bus vehicle V. When performing power supply or the like during the traveling of the bus vehicle V, the battery BT self-heats, so that the temperature of the battery BT may become excessively high. The temperature of the battery BT may become excessively high also during parking in the summer or the like. If the temperature of the battery BT becomes excessively high, deterioration of the battery cells is promoted, so that the life of the battery significantly decreases. Therefore, it is necessary to adjust the temperature of the battery BT so as to not become excessively high.

In consideration of these, the bus vehicle V can adjust the temperature of the battery BT by utilizing equipment for air conditioning the interior. In other words, the air conditioning system 1 of the bus vehicle V is configured to be able to not only air-condition the interior but also adjust the temperature of the battery BT as the target equipment.

In the bus vehicle V, a plurality of air conditioning zones Z are set in the interior of the bus vehicle V, as illustrated in FIG. 2. Specifically, two air conditioning zones Z, including a door side zone Zd on the left side of the interior and a panel side zone Zp on the right side of the interior, are set in the bus vehicle V. Of the interior of the bus vehicle V, the door side zone Zd is the air conditioning zone Z separated from an outside by the doors D1 and D2. Of the interior of the bus vehicle V, the panel side zone Zp is the air conditioning zone Z separated from the outside by the side panel SP.

Figure 3:
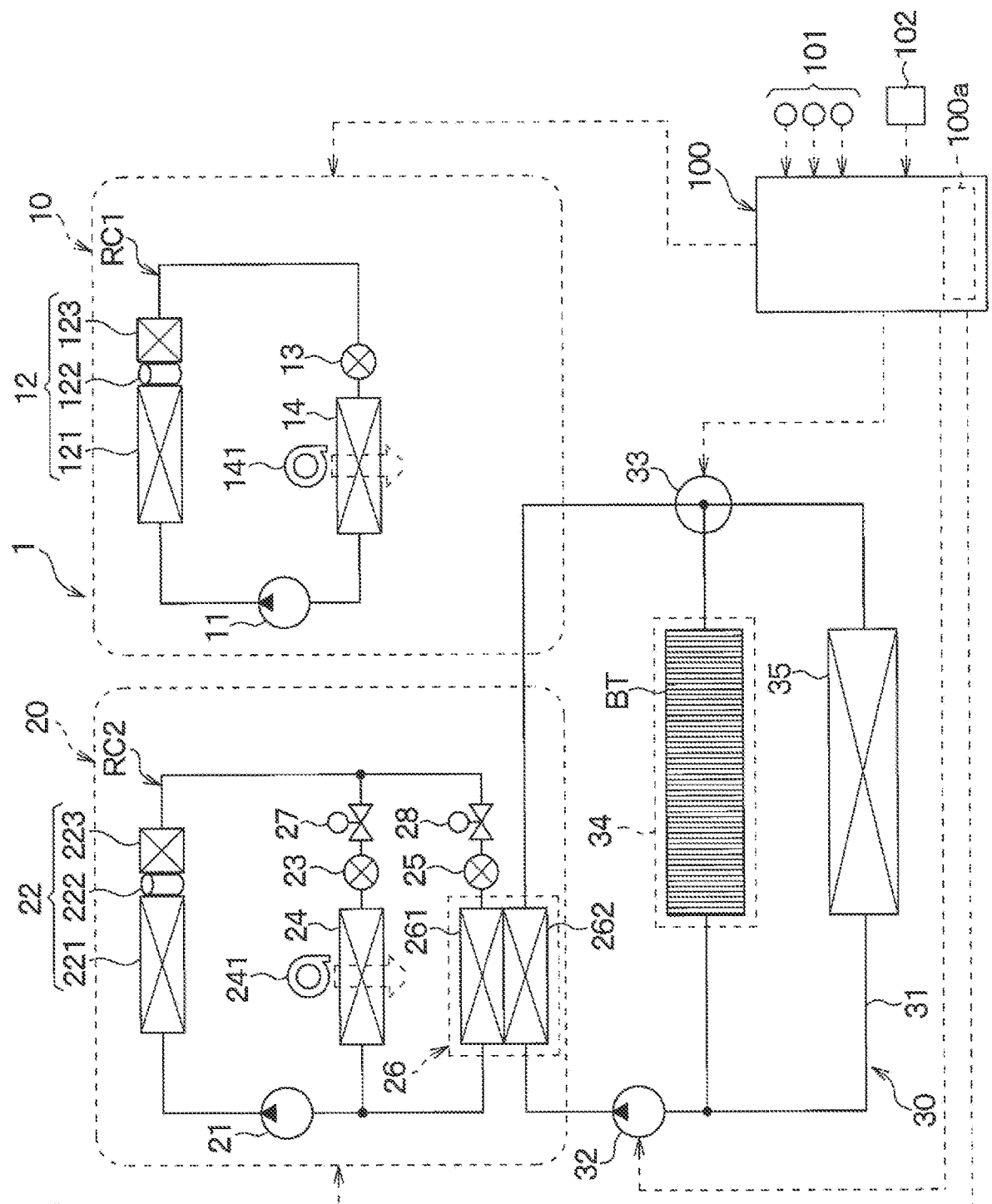
FIG. 3 is a schematic configuration diagram of the air conditioning system of the first embodiment.

In the air conditioning system 1, a plurality of air conditioners 10 and 20 are provided to respectively correspond to the plurality of air conditioning zones Z. That is, in the air conditioning system 1, the door side air conditioner 10 corresponding to the door side zone Zd and the panel side air conditioner 20 corresponding to the panel side zone Zp are provided. As illustrated in FIG. 3, the door side air conditioner 10 and the panel side air conditioner 20 respectively include vapor compression refrigeration cycles RC1 and RC2.

The door side air conditioner 10 includes a first compressor 11, a first radiator 12, a first interior expansion valve 13, and a first interior evaporator 14. The panel side air conditioner 20 includes a second compressor 21, a second radiator 22, a second interior expansion valve 23, a second interior evaporator 24, a second equipment expansion valve 25, a second equipment evaporator 26, a second cabin side on-off valve 27, and a second equipment side on-off valve 28.

The first compressor 11 and the second compressor 21 are equipment that compress and discharge a refrigerant. Each of the first compressor 11 and the second compressor 21 includes an electric compressor that drive a compression mechanism with an electric motor. The refrigerant discharge performance of each of the first compressor 11 and the second compressor 21 is controlled in accordance with a control signal from a controller 100 described later.

The first radiator 12 and the second radiator 22 are equipment that respectively radiate the heat of the refrigerant discharged from the first compressor 11 and the second compressor 21 to the outside. The first radiator 12 and the second radiator 22 respectively include condensing units 121 and 221, liquid receiving units 122 and 222, and subcooling portions 123 and 223 such that the refrigerant on outlet sides is in a subcooled state with a subcooling degree. Each of the condensing units 121 and 221 is a heat exchanger that condenses the refrigerant by radiating the heat of the refrigerant to the outside. The liquid receiving units 122 and 222 are gas-liquid separators that respectively separate the gas and liquid of the refrigerant having passed through the condensing units 121 and 221 and store the refrigerant that is surplus in the cycles. The subcooling portions 123 and 223 are heat exchangers that respectively cool the liquid refrigerant stored in the liquid receiving units 122 and 222 by radiating the heat thereof to the outside.

The first interior expansion valve 13 and the second interior expansion valve 23 are decompression units that respectively decompress and expand the refrigerant having passed through the first radiator 12 and the second radiator 22 to desired pressures. The first interior expansion valve 13 and the second interior expansion valve 23 respectively include thermal expansion valves that respectively adjust aperture openings of the first interior evaporator 14 and the second interior evaporator 24 such that superheat degrees, on the refrigerant outlet side, of the evaporators become predetermined values. Note that each of the first interior expansion valve 13 and the second interior expansion valve 23 may include an electric expansion valve without being limited to a mechanical expansion valve.

The first interior evaporator 14 and the second interior evaporator 24 are heat exchangers that respectively evaporate the refrigerant decompressed by the first interior expansion valve 13 and the second interior expansion valve 23. The first interior evaporator 14 and the second interior evaporator 24 are respectively provided with a first interior fan 141 and a second interior fan 241. Each of the first interior fan 141 and the second interior fan 241 includes an electric fan that rotates an impeller with an electric motor.

The first interior fan 141 is a blower fan that blows air to the door side zone Zd. The first interior evaporator 14 exchanges heat between the refrigerant decompressed by the first interior expansion valve 13 and the air blown from the first interior fan 141 to evaporate the refrigerant. That is, the first interior evaporator 14 absorbs heat from the air before blowing out to the door side zone Zd to evaporate the refrigerant. As a result, the air cooled and dehumidified by the first interior evaporator 14 is blown out toward the door side zone Zd.

The second interior fan 241 is a blower fan that blows air to the panel side zone Zp. The second interior evaporator 24 exchanges heat between the refrigerant decompressed by the second interior expansion valve 23 and the air blown from the second interior fan 241 to evaporate the refrigerant. That is, the second interior evaporator 24 absorbs heat from the air before blowing out to the panel side zone Zp to evaporate the refrigerant. As a result, the air cooled and dehumidified by the second interior evaporator 24 is blown out toward the panel side zone Zp.

Here, the panel side air conditioner 20 is provided with the second equipment expansion valve 25 and the second equipment evaporator 26. The second equipment expansion valve 25 and the second equipment evaporator 26 are provided in parallel to the second interior expansion valve 23 and the second interior evaporator 24 with respect to a refrigerant flow.

The second equipment expansion valve 25 is a decompression unit that decompresses and expands the refrigerant having passed through the second radiator 22 to a desired pressure. The second equipment expansion valve 25 is provided in a refrigerant pipe branching from a refrigerant pipe connecting the second radiator 22 and the second interior expansion valve 23. The second equipment expansion valve 25 is provided in parallel to the second interior expansion valve 23 with respect to the refrigerant flow. The second equipment expansion valve 25 includes a thermal expansion valve that adjusts an aperture opening of the second equipment evaporator 26 such that a superheat degree, on the refrigerant outlet side, of the evaporator becomes a predetermined value. Note that the second equipment expansion valve 25 may include an electric expansion valve without being limited to a mechanical expansion valve.

The second equipment evaporator 26 is a chiller that evaporates the refrigerant decompressed by the second equipment expansion valve 25. The second equipment evaporator 26 includes a refrigerant flow path 261 that allows the refrigerant decompressed by the second equipment expansion valve 25 to flow through, and a heat medium flow path 262 that allows a heat medium circulating in a cooling circuit 31 described later to flow through.

The second equipment evaporator 26 exchanges heat between the refrigerant flowing through the refrigerant flow path 261 and the heat medium flow path 262 to evaporate the refrigerant. The heat medium flowing through the heat medium flow path 262 is cooled with heat absorbed by the refrigerant flowing through the refrigerant flow path 261.

On the refrigerant outlet side of one of the second interior evaporator 24 and the second equipment evaporator 26, a non-illustrated evaporating pressure regulating valve for regulating the pressure in the one evaporator to a desired pressure is provided. As a result, the pressures of the refrigerant in the second interior evaporator 24 and the second equipment evaporator 26 can be adjusted in accordance with respective thermal loads.

The panel side air conditioner 20 is provided with the second cabin side on-off valve 27 and the second equipment side on-off valve 28. The second cabin side on-off valve 27 and the second equipment side on-off valve 28 function as a flow path switch valve that switches the flow path of the refrigerant having passed through the second radiator 22. Each of the second cabin side on-off valve 27 and the second equipment side on-off valve 28 is a solenoid valve, and is controlled in accordance with a control signal from the controller 100 described later.

The second cabin side on-off valve 27 is provided in a refrigerant pipe that guides the refrigerant having passed through the second radiator 22 to the second interior expansion valve 23. The second cabin side on-off valve 27 is a switching unit that switches between a state of permitting the flow of the refrigerant to the second interior evaporator 24 and a state of blocking the flow of the refrigerant to the second interior evaporator 24.

The second equipment side on-off valve 28 is provided in a refrigerant pipe that guides the refrigerant having passed through the second radiator 22 to the second equipment expansion valve 25. The second equipment side on-off valve 28 is a door side switching unit that switches between a second permitted state of permitting the flow of the refrigerant to the second equipment evaporator 26 and a second blocked state of blocking the flow of the refrigerant to the second equipment evaporator 26.

On the other hand, the door side air conditioner 10 includes only the first interior evaporator 14 that absorbs heat from the air blowing out into the interior, but does not include a heat absorber that absorbs heat from the heat medium. That is, the door side air conditioner 10 is not provided with configurations corresponding to the second equipment expansion valve 25 and the second equipment evaporator 26.

The air conditioning system 1 is provided with a cooler 30 including the above cooling circuit 31. The cooler 30 cools the battery BT as the target equipment. The cooler 30 adjusts the temperature of the battery BT by cooling the heat medium utilizing an endothermic action in a part of the plurality of air conditioners 10 and 20. As the heat medium, for example, an antifreeze containing ethylene glycol and the like can be adopted.

The cooler 30 includes the cooling circuit 31 that circulates the heat medium. The cooling circuit 31 is provided with a circulation pump 32, the heat medium flow path 262 of the second equipment evaporator 26, a three-way valve 33, a battery cooling unit 34, and a radiator 35.

The circulation pump 32 is an electric pump that pumps the heat medium into the heat medium flow path 262 of the second equipment evaporator 26. The pumping capability of the circulation pump 32 is controlled in accordance with a control signal from the controller 100 described later.

An inlet of the three-way valve 33 is connected to an outlet side of the heat medium flow path 262 of the second equipment evaporator 26. The three-way valve 33 is an electric three-way flow regulating valve that has one inlet and two outlets and can selectively open and close the two outlets. The three-way valve 33 is controlled in accordance with a control signal from the controller 100 described later.

An inlet of the battery cooling unit 34 is connected to one of the outlet sides of the three-way valve 33. The battery cooling unit 34 has a plurality of heat exchange flow paths disposed to be in contact with a plurality of battery cells constituting the battery BT. The battery cooling unit 34 cools the battery BT by exchanging heat between the heat medium flowing through the heat exchange flow paths and the battery cells.

Such a battery cooling unit 34 can be realized by disposing the heat exchange flow path between the adjacent battery cells. Note that the battery cooling unit 34 may be formed integrally with the battery BT by providing heat exchange flow paths in a case that houses the battery cells.

An inlet of the radiator 35 is connected to the other of the outlet sides of the three-way valve 33. The radiator 35 is a heat exchanger that radiates the heat of the heat medium having passed through the second equipment evaporator 26 by exchanging heat with outside air.

The battery cooling unit 34 and the radiator 35 are connected to a suction port of the circulation pump 32 via a merge portion provided on the outlet sides of the battery cooling unit 34 and the radiator 35. The battery cooling unit 34 and the radiator 35 are connected in parallel with respect to a heat medium flow.

Next, the controller 100, an electronic control unit of the air conditioning system 1, will be described. The controller 100 includes a computer having a processor and a memory, and peripheral circuits thereof. The controller 100 performs various calculations and processing on the basis of programs stored in the memory, and controls equipment connected to an output side thereof. The memory of the controller 100 includes a non-transitory tangible storage medium.

The first compressor 11, the first interior fan 141, the second compressor 21, the second interior fan 241, the second cabin side on-off valve 27, the second equipment side on-off valve 28, the circulation pump 32, the three-way valve 33, and the like are connected to an output side of the controller 100. Of the controller 100, software and hardware for controlling the door side air conditioner 10 and the panel side air conditioner 20 constitute an air conditioning control unit 100a in the present embodiment.

In the controller 100, a group of sensors 101 for air conditioning control and battery temperature control are connected to an input side of the controller 100. The group of sensors 101 include an inside air temperature sensor, an outside air temperature sensor, a solar radiation sensor, PT sensors that respectively detect pressures and temperatures, on the refrigerant outlet side, of the evaporators 14, 24, and 26, a battery temperature sensor that detects the temperature of the battery BT, and the like. Detection signals of the group of sensors 101 are input to the controller 100. As a result, the air conditioning system 1 can adjust the temperature of the blown air blown into the interior, the temperature of the battery BT, and the like in accordance with the physical quantities detected by the group of sensors 101.

In addition, an operation panel 102 to be used for various input operations is connected to the input side of the controller 100. The operation panel 102 is disposed near an instrument panel and includes various operation switches. Operation signals from the various operation switches provided on the operation panel 102 are input to the controller 100.

The various operation switches of the operation panel 102 include an auto switch, an operation mode changeover switch, an air volume setting switch, a temperature setting switch, a blowing mode changeover switch, and the like. The air conditioning system 1 can appropriately switch the operation modes of the air conditioning system 1 by receiving an input on the operation panel 102. Specifically, the controller 100 switches the operation modes of the air conditioning system 1 by controlling the second cabin side on-off valve 27 and the second equipment side on-off valve 28 to change the flow of the refrigerant in the panel side air conditioner 20.

Hereinafter, the operation of the air conditioning system 1 will be described. The air conditioning system 1 is configured to be able to execute interior cooling and equipment temperature control as the operation modes. The interior cooling is an operation mode in which the interior is cooled by the door side air conditioner 10 and the panel side air conditioner 20. The equipment temperature control is an operation mode in which the interior cooling and the temperature control of the battery BT are each performed by the door side air conditioner 10 and the panel side air conditioner 20. Operations of the air conditioning system 1 for the interior cooling and the equipment temperature control will be described below.

<Interior Cooling>

The interior cooling is an operation mode in which the air cooled to a desired temperature by the first interior evaporator 14 and the second interior evaporator 24 is blown out into the interior of the bus vehicle V. The interior cooling is executed by the air conditioning system 1, for example, when the operation mode is set to a cooling mode by the operation mode changeover switch.

The controller 100 appropriately determines operation states of various equipment during the interior cooling by using the detection signals of the group of sensors 101 and the operation signals of the operation panel 102. For example, the controller 100 controls the respective on-off valves 17 and 18 such that the second cabin side on-off valve 27 is opened and the second equipment side on-off valve 28 is closed. The controller 100 appropriately determines control signals for other equipment, such as the respective compressors 11 and 21 and the respective interior fans 141 and 241, by using the detection signals of the group of sensors 101 and the operation signals of the operation panel 102.

In the door side air conditioner 10, the high-pressure refrigerant discharged from the first compressor 11 flows, during the interior cooling, into the condensing unit 121 of the first radiator 12 and radiates heat. The refrigerant having passed through the condensing unit 121 flows into the liquid receiving unit 122, and gas and liquid are separated. The liquid refrigerant separated in the liquid receiving unit 122 flows into the subcooling portion 123 and radiates heat.

The refrigerant flowing out of the subcooling portion 123 flows into the first interior expansion valve 13 and is decompressed to a desired pressure by the first interior expansion valve 13. The refrigerant decompressed by the first interior expansion valve 13 flows into the first interior evaporator 14.

The refrigerant having flowed into the first interior evaporator 14 absorbs heat from the blown air from the first interior fan 141 and evaporates. That is, the refrigerant having flowed into the first interior evaporator 14 absorbs heat from the air before blowing out to the door side zone Zd and evaporates. As a result, the air cooled to a desired temperature by the first interior evaporator 14 is blown out to the door side zone Zd.

The refrigerant having passed through the first interior evaporator 14 is sucked into the first compressor 11. The refrigerant having been sucked into the first compressor 11 is compressed by the first compressor 11 until the refrigerant becomes a high-pressure refrigerant again.

On the other hand, in the panel side air conditioner 20, the high-pressure refrigerant discharged from the second compressor 21 flows into the condensing unit 221 of the second radiator 22 and radiates heat, similarly to the door side air conditioner 10. The refrigerant having passed through the condensing unit 221 flows into the liquid receiving unit 222, and gas and liquid are separated. The liquid refrigerant separated in the liquid receiving unit 222 flows into the subcooling portion 223 and radiates heat.

The refrigerant having flowed out of the subcooling portion 223 flows into the second interior expansion valve 23 and is decompressed to a desired pressure by the second interior expansion valve 23. During the interior cooling, the second equipment side on-off valve 28 is closed, so that the refrigerant does not flow into the second equipment expansion valve 25, and all of the refrigerant is decompressed by the second interior expansion valve 23.

The refrigerant decompressed by the second interior expansion valve 23 flows into the second interior evaporator 24. The refrigerant having flowed into the second interior evaporator 24 absorbs heat from the blown air from the second interior fan 241 and evaporates. That is, the refrigerant having flowed into the second interior evaporator 24 absorbs heat from the air before blowing out to the panel side zone Zp and evaporates. As a result, the air cooled to a desired temperature by the second interior evaporator 24 is blown out to the panel side zone Zp.

The refrigerant having passed through the second interior evaporator 24 is sucked into the second compressor 21. The refrigerant having been sucked into the second compressor 21 is compressed by the second compressor 21 until the refrigerant becomes a high-pressure refrigerant again.

During the interior cooling, the air cooled by the first interior evaporator 14 is blown out to the door side zone Zd, and the air cooled by the second interior evaporator 24 is blown out to the panel side zone Zp, as described above. As a result, interior cooling is realized.

<Equipment Temperature Control>

The equipment temperature control is an operation mode in which while the air cooled to a desired temperature by the first interior evaporator 14 and the second interior evaporator 24 is being blown out into the interior of the bus vehicle V, the temperature of the battery BT as the target equipment is adjusted by utilizing the latent heat of evaporation of the refrigerant. The equipment temperature control is executed by the air conditioning system 1, for example, when the temperature of the battery BT exceeds the upper limit of an appropriate temperature in a state where the auto switch is turned on. Note that the execution condition of the equipment temperature control may be different from that described above.

The controller 100 appropriately determines operation states of various equipment during the equipment temperature control by using the detection signals of the group of sensors 101 and the operation signals of the operation panel 102. For example, the controller 100 controls the respective on-off valves 27 and 28 such that the second cabin side on-off valve 27 and the second equipment side on-off valve 28 are each opened. The controller 100 controls the three-way valve 33 such that all of the heat medium having passed through the heat medium flow path 262 of the second equipment evaporator 26 flows into the battery cooling unit 34. The controller 100 appropriately determines control signals for other equipment, such as the respective compressors 11 and 21, the respective interior fans 141 and 241, and the circulation pump 32, by using the detection signals of the group of sensors 101 and the operation signals of the operation panel 102.

During equipment cooling, the high-pressure refrigerant discharged from the first compressor 11 flows into the first radiator 12 and radiates heat in the door side air conditioner 10, similarly to the interior cooling. The refrigerant having flowed out of the radiator 12 flows into the first interior expansion valve 13.

The refrigerant having flowed into the first interior expansion valve 13 is decompressed to a desired pressure by the first interior expansion valve 13, and then flows into the first interior evaporator 14. The refrigerant having flowed into the first interior evaporator 14 absorbs heat from the blown air from the first interior fan 141 and evaporates. As a result, the air cooled to a desired temperature by the first interior evaporator 14 is blown out to the door side zone Zd.

The refrigerant having passed through the first interior evaporator 14 is sucked into the first compressor 11. The refrigerant having been sucked into the first compressor 11 is compressed by the first compressor 11 until the refrigerant becomes a high-pressure refrigerant again.

On the other hand, in the panel side air conditioner 20, the high-pressure refrigerant discharged from the second compressor 21 flows into the second radiator 22 and radiates heat, similarly to the interior cooling. The refrigerant having flowed out of the second radiator 22 flows into the second interior expansion valve 23 and the second equipment expansion valve 25.

The refrigerant having flowed into the second interior expansion valve 23 is decompressed to a desired pressure by the second interior expansion valve 23. The refrigerant decompressed by the second interior expansion valve 23 flows into the second interior evaporator 24.

The refrigerant having flowed into the second interior evaporator 24 absorbs heat from the blown air from the second interior fan 241 and evaporates. That is, the refrigerant having flowed into the second interior evaporator 24 absorbs heat from the air before blowing out to the panel side zone Zp and evaporates. As a result, the air cooled to a desired temperature by the second interior evaporator 24 is blown out to the panel side zone Zp.

On the other hand, the refrigerant having flowed into the second equipment expansion valve 25 is decompressed to a desired pressure by the second equipment expansion valve 25, and then flows into the second equipment evaporator 26. The refrigerant having flowed into the second equipment evaporator 26 absorbs heat from the heat medium flowing in the cooling circuit 31 and evaporates. As a result, the heat medium flowing in the cooling circuit 31 is cooled when passing through the heat medium flow path 262 of the second equipment evaporator 26.

The refrigerant having passed through the second interior evaporator 24 and the refrigerant having passed through the second equipment evaporator 26 are sucked into the second compressor 21. The refrigerant having been sucked into the second compressor 21 is compressed by the second compressor 21 until the refrigerant becomes a high-pressure refrigerant again.

Here, the heat medium cooled by the second equipment evaporator 26 flows to the battery cooling unit 34 and absorbs heat from the battery BT. As a result, the battery BT is cooled. That is, during the equipment temperature control, the battery BT is cooled by utilizing an endothermic action due to the evaporation of the refrigerant in the second equipment evaporator 26.

During the equipment temperature control, the air cooled by the respective interior evaporators 14 and 24 are blown out to the respective zones Zd and Zp, and the heat medium cooled by the second equipment evaporator 26 is supplied to the battery cooling unit 34, as described above. As a result, the cooling of the interior and the cooling of the battery BT are realized.

The air conditioning system 1 described above is configured to divide the interior of the bus vehicle V into a plurality of the air conditioning zones Z and perform air conditioning of the plurality of air conditioning zones Z by a plurality of the air conditioners 10 and 20 provided to respectively correspond to the plurality of air conditioning zones Z. Specifically, in the bus vehicle V, one or more doors D are provided on the side surface on one side in the width direction DR3, the side panel SP is provided on the side surface on the other side in the width direction, the door side zone Zd is set on one side in the width direction DR3, and the panel side zone Zp is set on the other side in the width direction DR3. According to this, air-conditioned air suitable for each of the air conditioning zones Z can be provided, so that comfort in the interior can be ensured.

Here, of the air conditioning zones Z, the door side zone Zd near the doors D1 and D2 of the bus vehicle V is less likely to have a lower temperature than the panel side zone Zp away from the doors D1 and D2 of the bus vehicle V, because the door side zone Zd is more likely to cause ventilation loss due to opening and closing of the doors D1 and D2.

Figure 4:
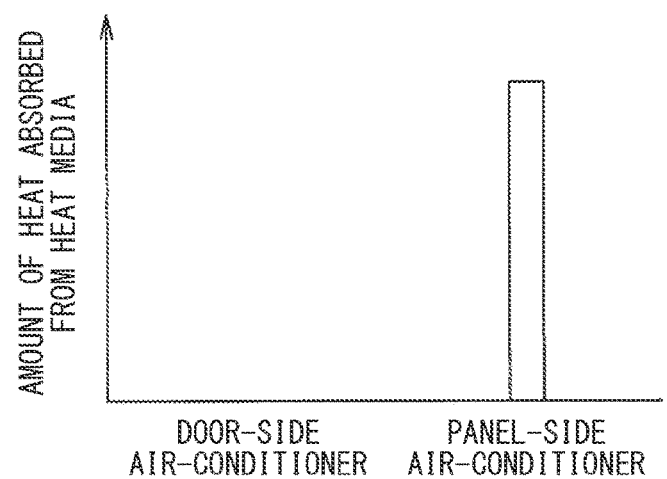
FIG. 4 is an explanatory diagram for explaining a difference between a door-side air conditioner and a panel-side air conditioner of the air conditioning system of the first embodiment.

In consideration of this, the panel side air conditioner 20 includes the second equipment evaporator 26 and the door side air conditioner 10 does not include a heat absorber that absorbs heat from the heat medium, in the air conditioning system 1 of the present embodiment. In such a configuration, the amount of the heat absorbed from the heat medium during the equipment temperature control is smaller in the door side air conditioner 10 than in the panel side air conditioner 20, as illustrated in FIG. 4.

Since the door side air conditioner 10 does not absorb heat from the heat medium during the equipment temperature control, the amount of the heat absorbed from the air blowing out to the door side zone Zd increases. As a result, the temperature of the door side zone Zd can be sufficiently lowered. That is, the door side air conditioner 10 can concentrate the endothermic action of the refrigeration cycle RC1 on the air blowing out to the door side zone Zd. Therefore, even when the battery BT is cooled, comfort in the door side zone Zd near the doors D1 and D2 of the bus vehicle V can be ensured. That is, according to the air conditioning system 1, it is possible to ensure comfort in the air conditioning zone Z where ventilation loss due to opening and closing of the platforms E1 and E2 by the passenger doors easily occurs.

Modification of First Embodiment

In the first embodiment, the bus vehicle V has been exemplified by what is provided with the platforms E1 and E2 and the doors D1 and D2 at two locations of the front portion and center portion of the side surface on the left side in the width direction DR3. However, the bus vehicle V is not limited thereto.

Figure 5:
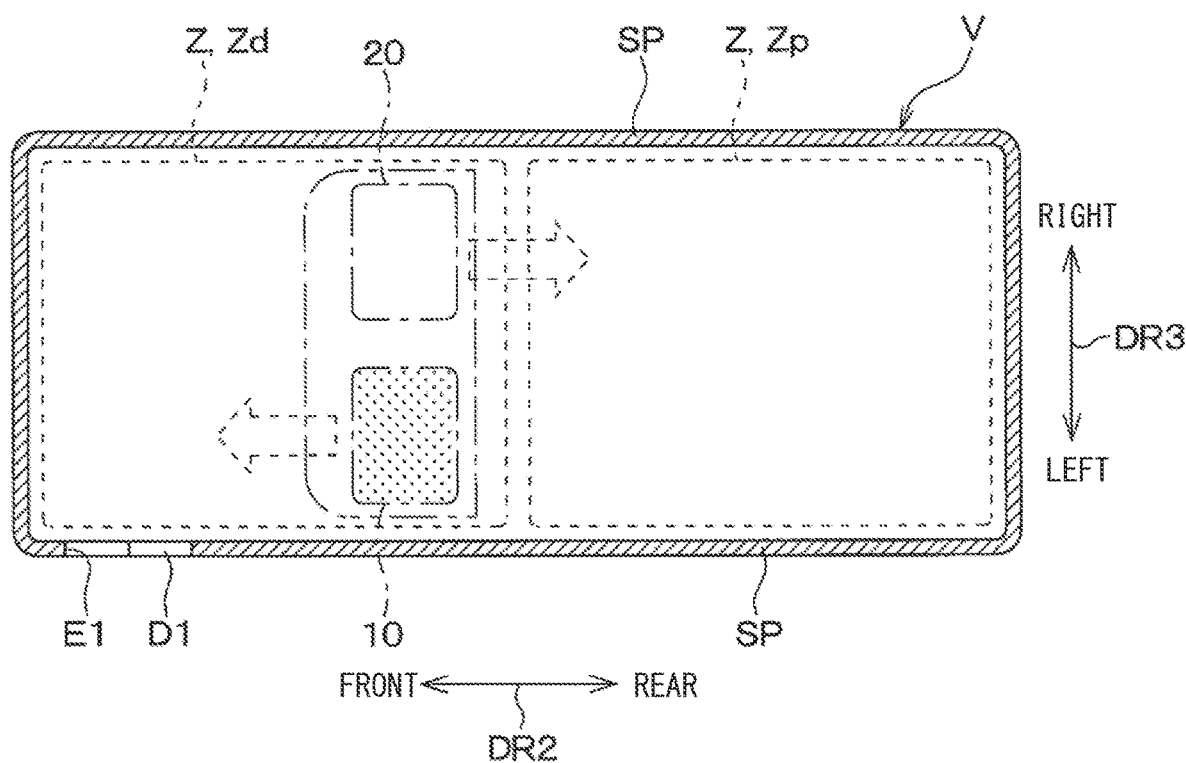
FIG. 5 is an explanatory diagram for explaining a first modification of the bus vehicle to which the air conditioning system of the first embodiment is applied.

The bus vehicle V may be provided, for example, with one door on the side surface on one side in the width direction DR3 and the side panel SP on the side surface on the other side. Specifically, the bus vehicle V may be provided with the platform E1 and the door D1 at one location of the front portion of the side surface on the left side in the width direction DR3, as illustrated in FIG. 5. In this case, the door side zone Zd is set in the front of the interior and the panel side zone Zp is set in the rear of the interior, and the panel side zone Zp is air conditioned by the panel side air conditioner 20 while the door side zone Zd is air conditioned by the door side air conditioner 10. As a result, the same effects as those of the first embodiment can be obtained. Note that the bus vehicle V may be provided, for example, with one or more doors on the side surface on the right side in the width direction DR3.

Figure 6:
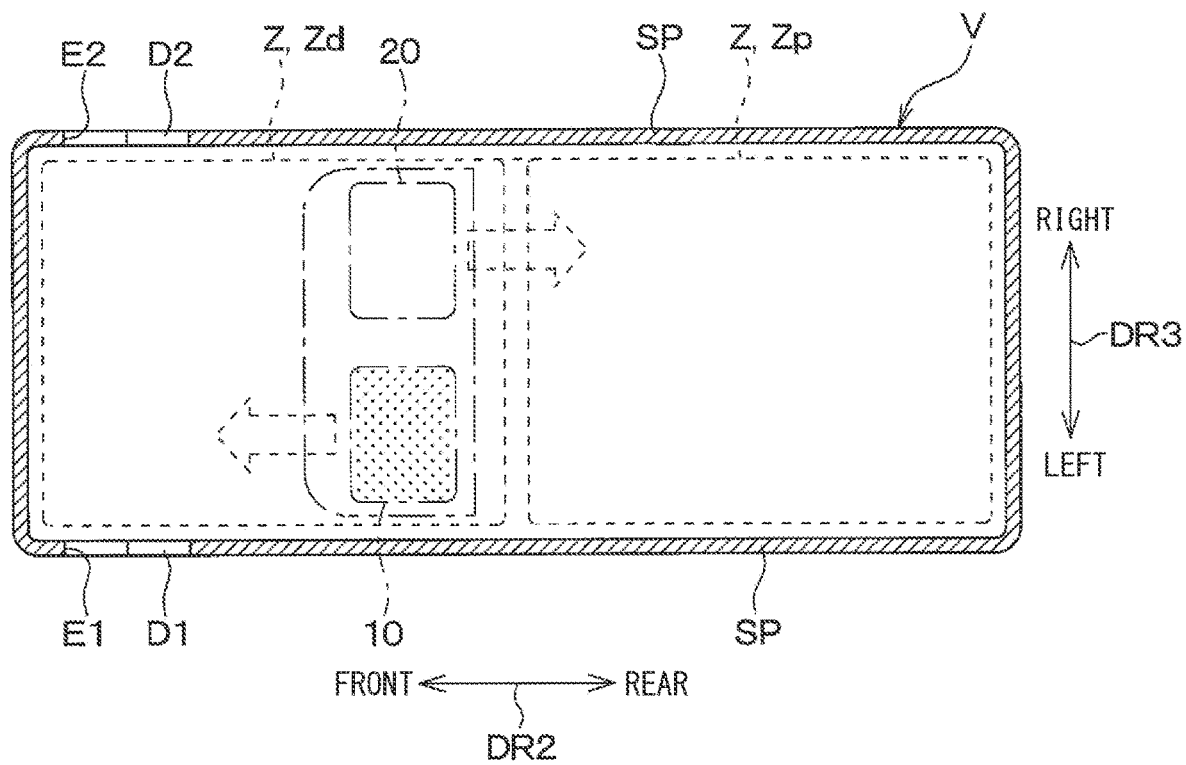
FIG. 6 is a schematic diagram for explaining a second modification of the bus vehicle to which the air conditioning system of the first embodiment is applied.

The bus vehicle V may be provided, for example, with one or more doors in either the fronts or the rears of the side surfaces on both sides in the width direction DR3, and with the side panels SP in the others. Specifically, the bus vehicle V may be provided with the platforms E1 and E2 and the doors D1 and D2 at two locations of the front portions of the side surfaces on both sides in the width direction DR3, as illustrated in FIG. 6. In this case, the door side zone Zd is set in the front of the interior and the panel side zone Zp is set in the rear of the interior, and the panel side zone Zp is air conditioned by the panel side air conditioner 20 while the door side zone Zd is air conditioned by the door side air conditioner 10. As a result, the same effects as those of the first embodiment can be obtained. The bus vehicle V may be provided, for example, with doors, in the rear of the interior, on the side surfaces on both sides in the width direction DR3.

Second Embodiment

Figure 7:
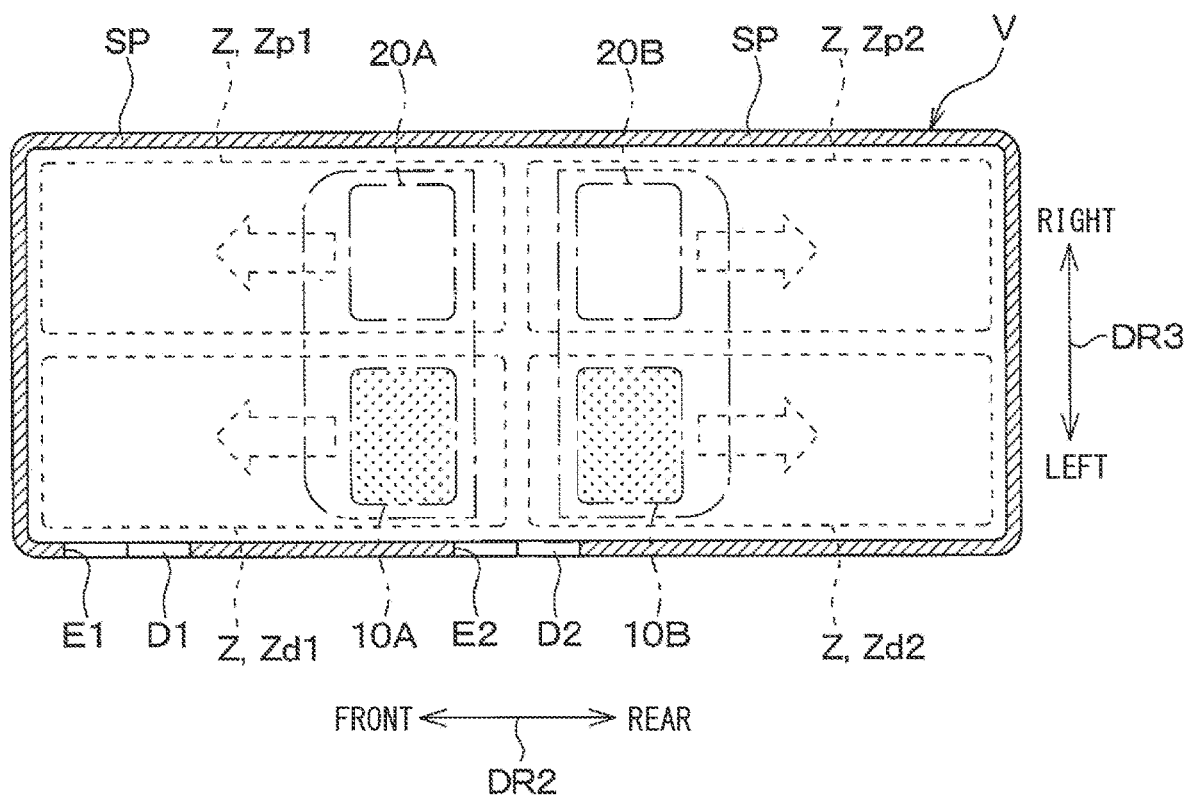
FIG. 7 is an explanatory diagram for explaining a bus vehicle to which an air conditioning system of a second embodiment is applied.

Next, a second embodiment will be described with reference to FIG. 7. In the present embodiment, differences from the first embodiment will be mainly described.

In the present embodiment, an example will be described in which the air conditioning system 1 is applied to the bus vehicle V in which the air conditioning zones Z are set at four locations of the front, rear, left, and right of the interior. As illustrated in FIG. 7, the bus vehicle V is provided with the platforms E1 and E2 and doors D1 and D2 at two points of a front portion and a center portion of the side surface on the left side in the width direction DR3. In the bus vehicle V, four air conditioning zones Z, including a first door side zone Zd1 in the front on the left side of the interior, a second door side zone Zd2 in the rear, a first panel side zone Zp1 in the front on the right side of the interior, and a second panel side zone Zp2 in the rear, are set.

The air conditioning system 1 is provided with a first door side air conditioner 10A, a second door side air conditioner 10B, a first panel side air conditioner 20A, and a second panel side air conditioner 20B that respectively correspond to the four air conditioning zones Z. Each of the door side air conditioners 10A and 10B is configured similarly to the door side air conditioner 10 described in the first embodiment. Each of the panel side air conditioners 20A and 20B is also configured similarly to the panel side air conditioner 20 described in the first embodiment.

Other configurations are the same as those of the first embodiment. The air conditioning system 1 of the present embodiment can obtain effects exerted from a configuration common to or equivalent to that of the first embodiment, similarly to the first embodiment.

Since the air conditioning zones Z are set at four locations of the front, rear, left, and right of the interior, the air conditioning system 1 of the present embodiment can provide air-conditioned air suitable for the respective spaces of the front, rear, left, and right of the interior. As a result, comfort in the interior can be sufficiently ensured.

Modification of Second Embodiment

In the second embodiment, the bus vehicle V has been exemplified by what is provided with the platforms E1 and E2 and the doors D1 and D2 at two locations of the front portion and center portion of the side surface on the left side in the width direction DR3. However, the bus vehicle V is not limited thereto.

Figure 8:
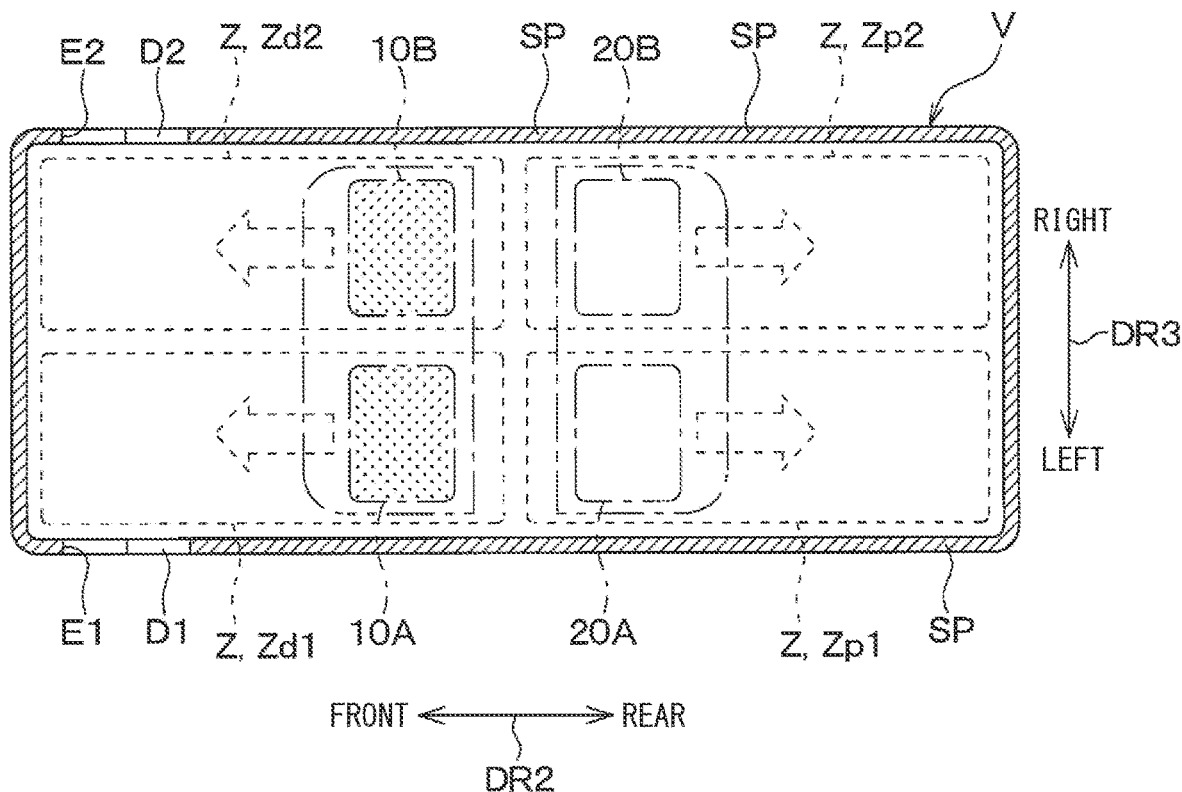
FIG. 8 is an explanatory diagram for explaining a first modification of the bus vehicle to which the air conditioning system of the second embodiment is applied.

The bus vehicle V may be provided, for example, with one or more doors in either the fronts or the rears of the side surfaces on both sides in the width direction DR3, and with the side panels SP in the others. Specifically, the bus vehicle V may be provided with the platforms E1 and E2 and the doors D1 and D2 at two locations of the front portions of the side surfaces on both sides in the width direction DR3, as illustrated in FIG. 8. In this case, the first door side zone Zd1 and the second door side zone Zd2 are set in the front of the interior, and the respective door side zones Zd1 and Zd2 are air conditioned by the respective door side air conditioners 10A and 10B. As a result, air-conditioned air suitable for the front of the interior can be provided similarly to the second embodiment. In addition, the first panel side zone Zp1 and the second panel side zone Zp2 are set in the rear of the interior, and the respective panel side zones Zp1 and Zp2 are air conditioned by the respective panel side air conditioners 20A and 20B. As a result, air-conditioned air suitable for the rear of the interior can be provided similarly to the second embodiment. Note that the bus vehicle V may be provided, for example, with one or more doors in the rear portions of the side surfaces on both sides in the width direction DR3.

The bus vehicle V may be provided, for example, with one door on the side surface on one side in the width direction DR3 and the side panel SP on the side surface on the other side.

Figure 9:
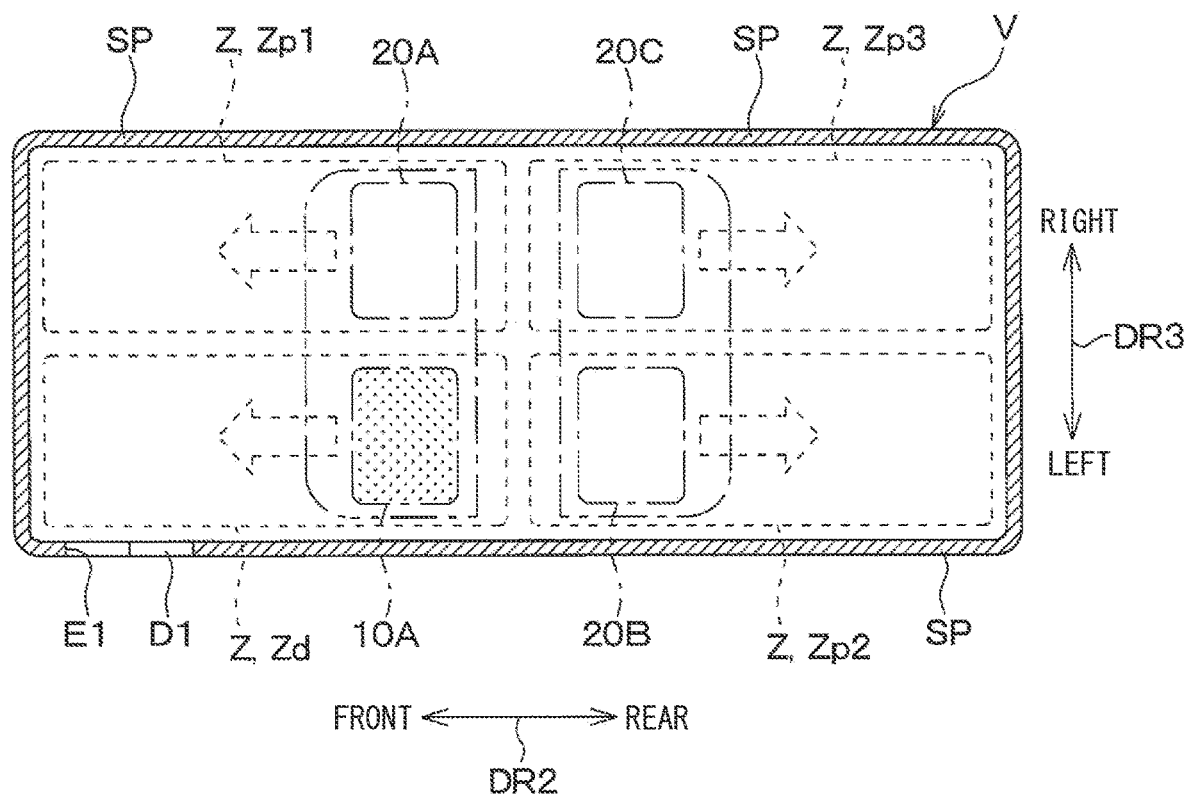
FIG. 9 is an explanatory diagram for explaining a second modification of the bus vehicle to which the air conditioning system of the second embodiment is applied.

Specifically, the bus vehicle V may be provided with the platform E1 and the door D1 at one location of the front portion of the side surface on the left side in the width direction DR3, as illustrated in FIG. 9. In this case, the door side zone Zd is set in the front on the left side of the interior, and the door side zone Zd is air conditioned by the door side air conditioner 10. As a result, air-conditioned air suitable for a space in the front on the left side of the interior can be provided. In addition, the first panel side zone Zp1 is set in the front on the left side of the interior, and the second panel side zone Zp2 and a third panel side zone Zp3 are set in the rear of the interior. The respective panel side zones Zp1, Zp2, and Zp3 are air conditioned by respective panel side air conditioners 20A, 20B, and 20C. As a result, air-conditioned air suitable for the respective places of the interior can be provided.

Figure 10:
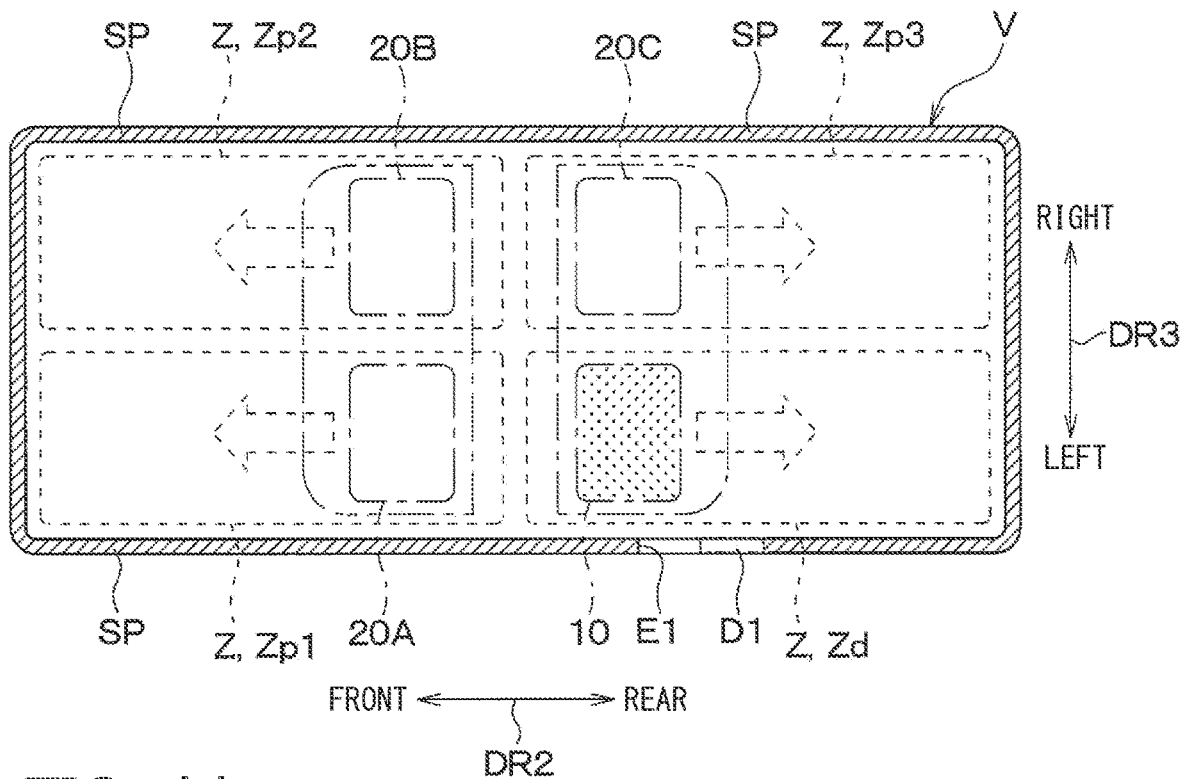
FIG. 10 is an explanatory diagram for explaining a third modification of the bus vehicle to which the air conditioning system of the second embodiment is applied.

In addition, the bus vehicle V may be provided with the platform E1 and the door D1 at one location of the rear portion of the side surface on the left side in the width direction DR3, as illustrated in FIG. 10. In this case, the door side zone Zd is set in the rear on the left side of the interior, and the door side zone Zd is air conditioned by the door side air conditioner 10. As a result, air-conditioned air suitable for a space in the rear on the left side of the interior can be provided. In addition, the first panel side zone Zp1 and the second panel side zone Zp2 are set in the front of the interior, and the third panel side zone Zp3 is set in the rear on the right side of the interior. The respective panel side zones Zp1, Zp2, and Zp3 are air conditioned by respective panel side air conditioners 20A, 20B, and 20C. As a result, air-conditioned air suitable for the respective places of the interior can be provided. Note that the bus vehicle V may be provided, for example, with one or more doors on the side surface on the right side in the width direction DR3.

Third Embodiment

Figure 11:
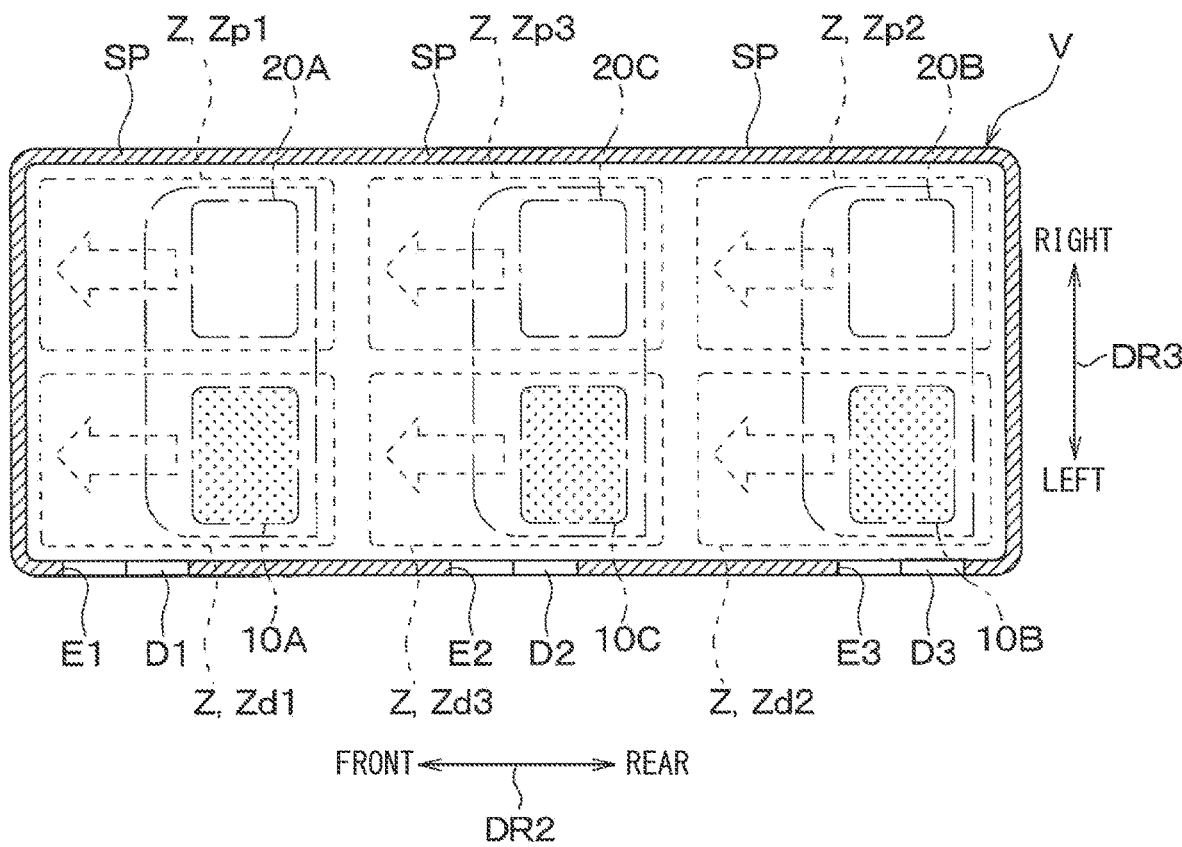
FIG. 11 is an explanatory diagram for explaining a bus vehicle to which an air conditioning system of a third embodiment is applied.

Next, a third embodiment will be described with reference to FIG. 11. In the present embodiment, differences from the second embodiment will be mainly described.

In the present embodiment, an example will be described in which the air conditioning system 1 is applied to the bus vehicle V in which the air conditioning zones Z are set at three locations on each of both sides in the width direction DR3 of the interior. As illustrated in FIG. 11, the bus vehicle V is provided with platforms E1, E2, and E3 and doors D1, D2, and D3 at three locations of a front portion, a center portion, and a rear portion of the side surface on the left side in the width direction DR3. Three air conditioning zones Z are set on the left side of the interior of the bus vehicle V, in which the first door side zone Zd1 is set in the front, the second door side zone Zd2 in the rear, and a third door side zone Zd3 in the center. In addition, three air conditioning zones Z are set on the right side of the interior, in which the first panel side zone Zp1 is set in the front, the second panel side zone Zp2 in the rear, and a third panel side zone Zp3 in the center.

The air conditioning system 1 is provided with the first door side air conditioner 10A, the second door side air conditioner 10B, a third door side air conditioner 10C, the first panel side air conditioner 20A, the second panel side air conditioner 20B, and a third panel side air conditioner 20C that respectively correspond to the six air conditioning zones Z. Each of the door side air conditioners 10A, 10B, and 10C is configured similarly to the door side air conditioner 10 described in the first embodiment. Each of the panel side air conditioners 20A, 20B, and 20C is also configured similarly to the panel side air conditioner 20 described in the first embodiment.

Other configurations are the same as those of the second embodiment. The air conditioning system 1 of the present embodiment can obtain effects exerted from a configuration common to or equivalent to those of the first and second embodiments, similarly to the first and second embodiments.

Since the air conditioning zones Z are set at three locations on each of both sides in the width direction DR3 of the interior in the air conditioning system 1 of the present embodiment, air-conditioned air suitable for the respective spaces in the front, rear, left, right, and center of the interior can be provided. As a result, comfort in the interior can be sufficiently ensured.

Modification of Third Embodiment

In the third embodiment, the bus vehicle V has been exemplified by what is provided with the platforms E1, E2, and E3 and the doors D1, D2, and D3 at three locations of the front portion, center portion, and rear portion of the side surface on the left side in the width direction DR3. However, the bus vehicle V is not limited thereto.

Figure 12:
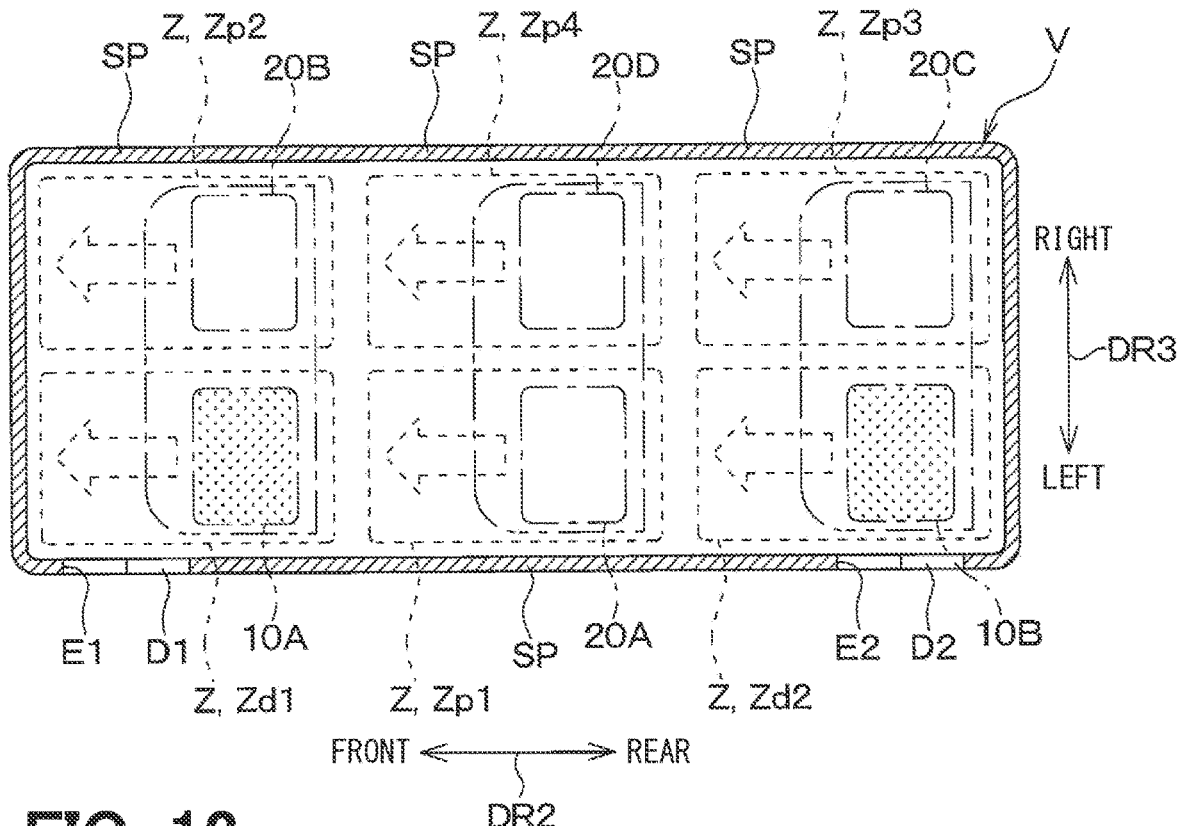
FIG. 12 is an explanatory diagram for explaining a first modification of the bus vehicle to which the air conditioning system of the third embodiment is applied.

The bus vehicle V may be provided with the doors D1 and D2 in the front and rear of the side surface on the left side in the width direction DR3, and with the side panels SP in the center portion of the side surface on the left side and on the side surface on the right side, as illustrated in FIG. 12. In this case, the first door side zone Zd1 is set in the front on the left side of the interior and the second door side zone Zd2 is set in the rear, and the respective door side zones Zd1 and Zd2 are air conditioned by the respective door side air conditioners 10A and 10B. As a result, air-conditioned air suitable for the front and rear on the left side of the interior can be provided. In addition, the first panel side zone Zp1 is set in the center portion on the left side of the interior, the second panel side zone Zp2 in the front on the right side of the interior, the third panel side zone Zp3 in the rear, and a fourth panel side zone Zp4 in the center. The respective panel side zones Zp1, Zp2, Zp3, and Zp4 are air conditioned by respective panel side air conditioners 20A, 20B, 20C, and 20D. As a result, air-conditioned air suitable for the center portion on the left side of the interior and the right side of the interior can be provided. Note that the bus vehicle V may be provided, for example, with one or more doors on the side surface on the right side in the width direction DR3.

Figure 13:
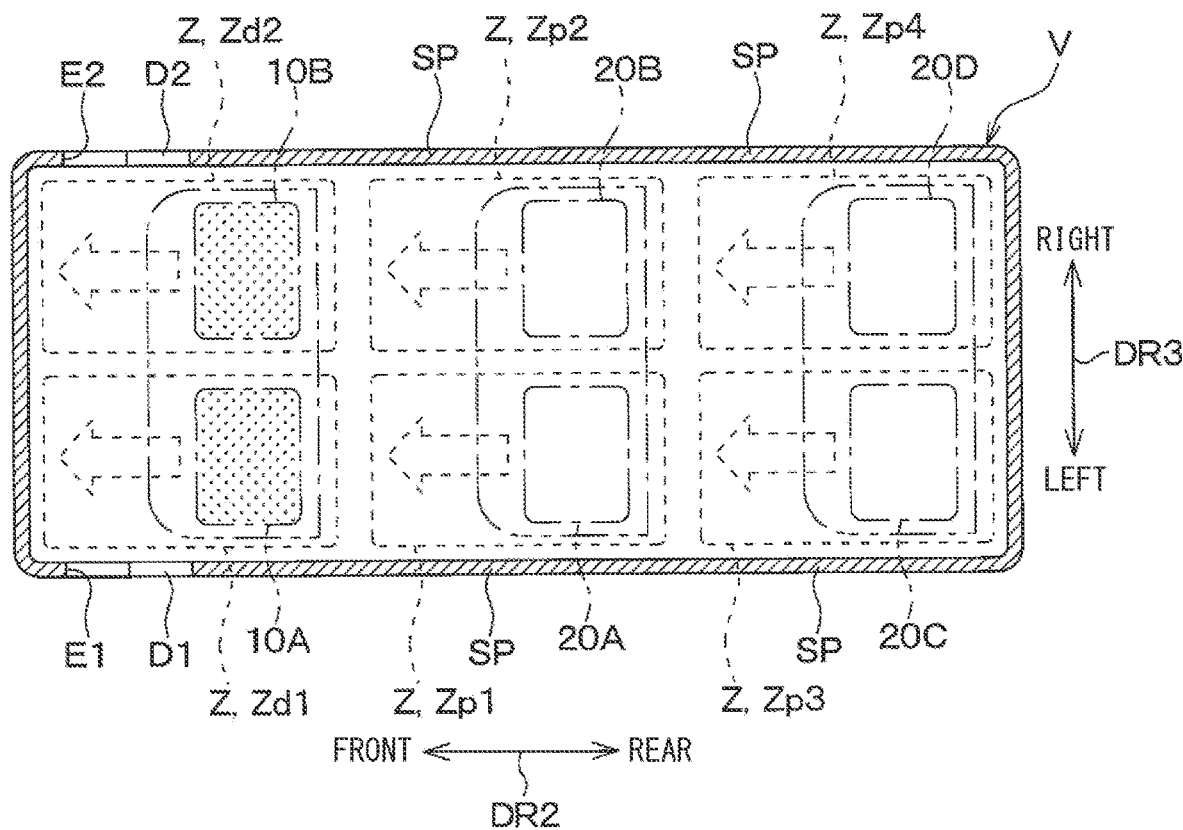
FIG. 13 is an explanatory diagram for explaining a second modification of the bus vehicle to which the air conditioning system of the third embodiment is applied.

Alternatively, the bus vehicle V may be provided, for example, with the platforms E1 and E2 and the doors D1 and D2 at two locations of the front portions of the side surfaces on both sides in the width direction DR3, as illustrated in FIG. 13. In this case, the first door side zone Zd1 and the second door side zone Zd2 are set in the front of the interior, and the respective door side zones Zd1 and Zd2 are air conditioned by the respective door side air conditioners 10A and 10B. As a result, air-conditioned air suitable for the front of the interior can be provided. In addition, the first panel side zone Zp1 and the second panel side zone Zp2 are set in the center of the interior, and the third panel side zone Zp3 and the fourth panel side zone Zp4 are set in the rear of the interior. The respective panel side zones Zp1, Zp2, Zp3, and Zp4 are air conditioned by the respective panel side air conditioners 20A, 20B, 20C, and 20D. As a result, air-conditioned air suitable for the center of the interior and the rear of the interior can be provided.

Figure 14:
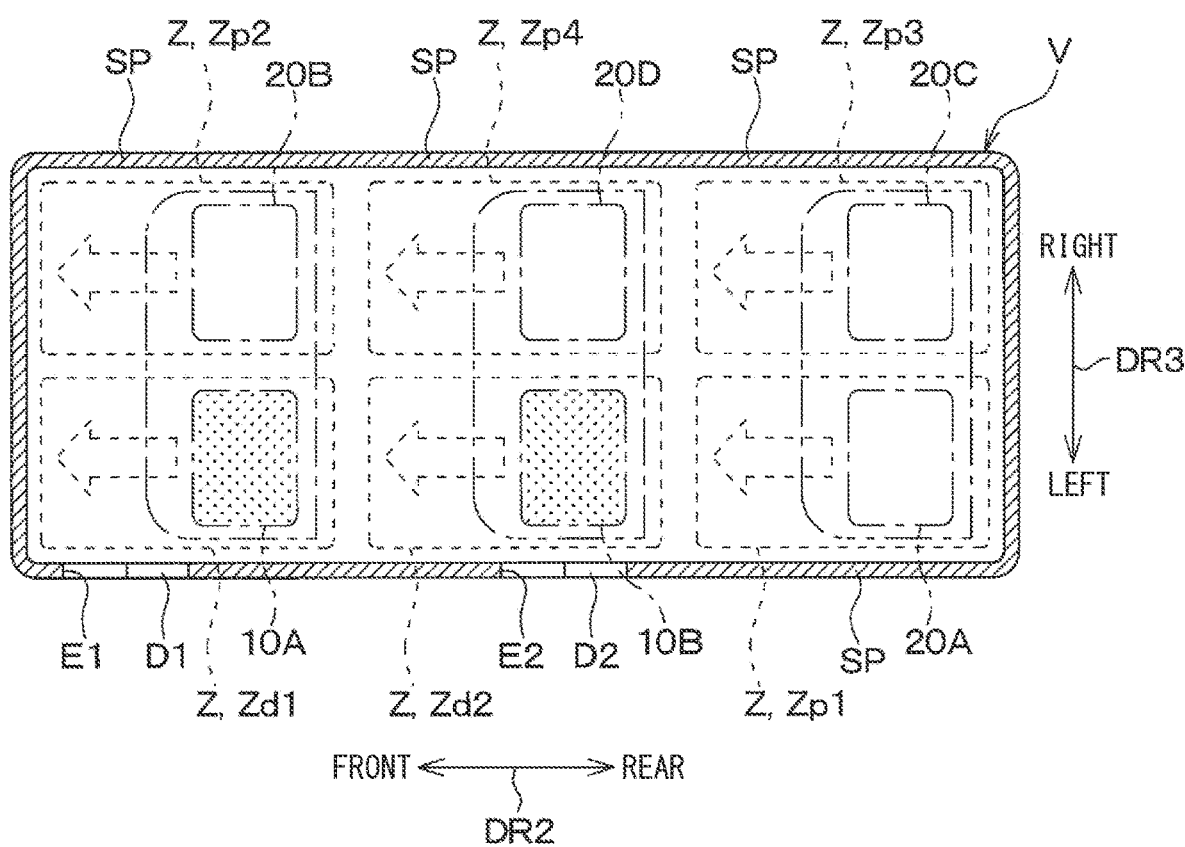
FIG. 14 is an explanatory diagram for explaining a third modification of the bus vehicle to which the air conditioning system of the third embodiment is applied.

Alternatively, the bus vehicle V may be provided, for example, with the doors D1 and D2 in the front and center of the side surface on the left side in the width direction DR3, and with the side panels SP in the rear portion of the side surface on the left side and on the side surface on the right side, as illustrated in FIG. 14. In this case, the first door side zone Zd1 is set in the front on the left side of the interior and the second door side zone Zd2 is set in the center, and the respective door side zones Zd1 and Zd2 are air conditioned by the respective door side air conditioners 10A and 10B. As a result, air-conditioned air suitable for the front and center on the left side of the interior can be provided. In addition, the first panel side zone Zp1 is set in the rear on the left side of the interior, the second panel side zone Zp2 in the front on the right side of the interior, the third panel side zone Zp3 in the rear, and the fourth panel side zone Zp4 in the center. The respective panel side zones Zp1, Zp2, Zp3, and Zp4 are air conditioned by respective panel side air conditioners 20A, 20B, 20C, and 20D. As a result, air-conditioned air suitable for the center portion on the left side of the interior and the right side of the interior can be provided. Note that the bus vehicle V may be provided, for example, with one or more doors on the side surface on the right side in the width direction DR3.

Fourth Embodiment

Next, a fourth embodiment will be described with reference to FIGS. 15 to 17. In the present embodiment, differences from the first embodiment will be mainly described.

The air conditioning system 1 of the present embodiment is provided with heat absorbers, each absorbing heat from the heat medium, in a door side air conditioner 10X and a panel side air conditioner 20X. Since the panel side air conditioner 20X of the present embodiment has the same configuration as that described in the first embodiment, description of the panel side air conditioner 20X will be omitted.

Figure 15:
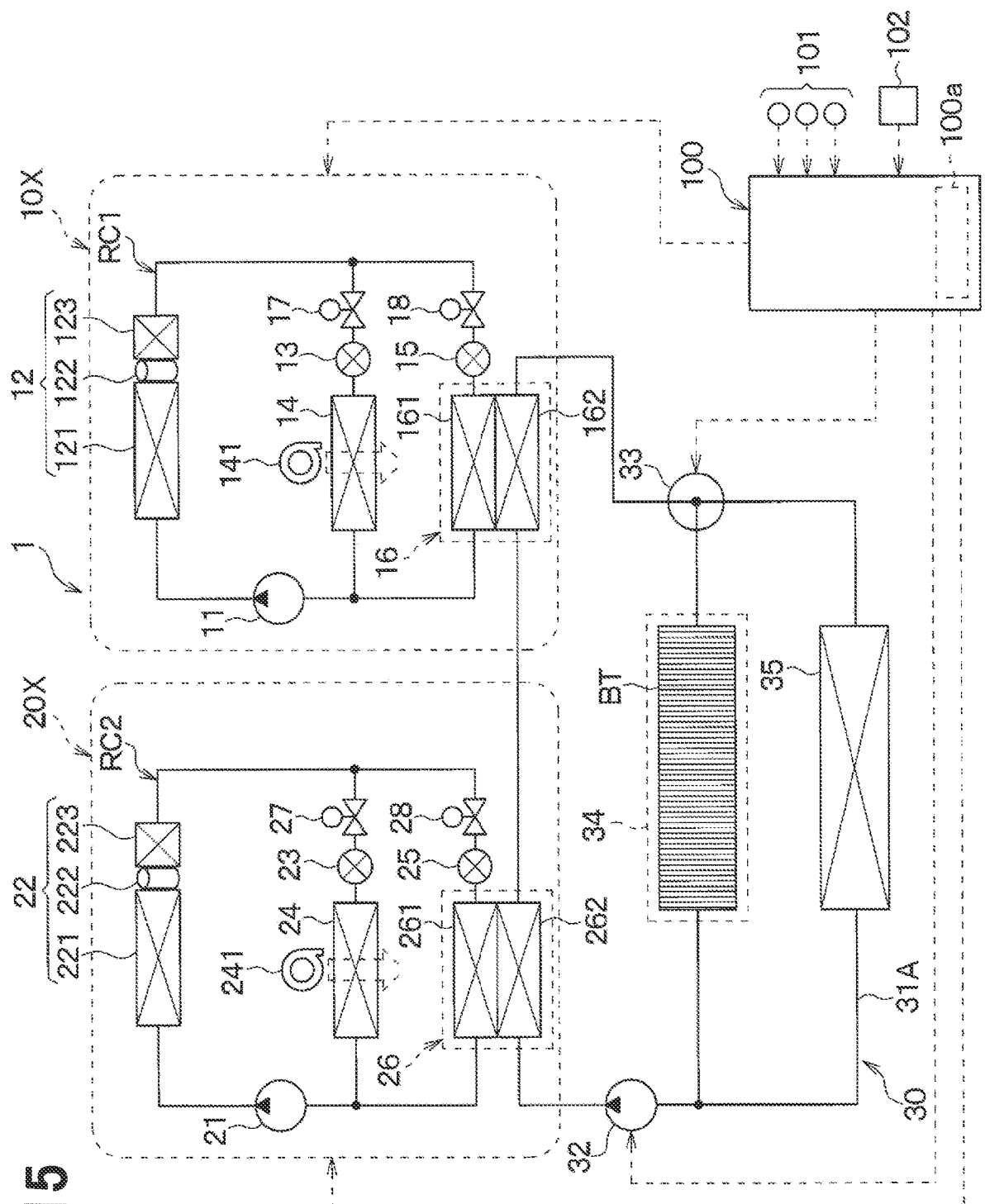
FIG. 15 is a schematic configuration diagram of an air conditioning system according to a fourth embodiment.

As illustrated in FIG. 15, the door side air conditioner 10X of the present embodiment is provided with a first equipment expansion valve 15 and a first equipment evaporator 16. The first equipment expansion valve 15 and the first equipment evaporator 16 are provided in parallel to the first interior expansion valve 13 and the first interior evaporator 14 with respect to the refrigerant flow.

The first equipment expansion valve 15 is a decompression unit that decompresses and expands the refrigerant having passed through first radiator 12 to a desired pressure. The first equipment expansion valve 15 is provided in a refrigerant pipe branching from a refrigerant pipe connecting the first radiator 12 and the first interior expansion valve 13. The first equipment expansion valve 15 is provided in parallel to the first interior expansion valve 13 with respect to the refrigerant flow. The first equipment expansion valve 15 includes a thermal expansion valve that adjusts an aperture opening of the first equipment evaporator 16 such that a superheat degree, on the refrigerant outlet side, of the evaporator becomes a predetermined value. Note that the first equipment expansion valve 15 may include an electric expansion valve without being limited to a mechanical expansion valve.

The first equipment evaporator 16 is a chiller that evaporates the refrigerant decompressed by the first equipment expansion valve 15. The first equipment evaporator 16 includes a refrigerant flow path 161 that allows the refrigerant decompressed by the first equipment expansion valve 15 to flow through, and a heat medium flow path 162 that allows the heat medium circulating in a cooling circuit 31 described later to flow through.

The first equipment evaporator 16 exchanges heat between the refrigerant flowing through the refrigerant flow path 161 and the heat medium flow path 162 to evaporate the refrigerant. The heat medium flowing through the heat medium flow path 162 is cooled with the heat absorbed by the refrigerant flowing through the refrigerant flow path 161.

On the refrigerant outlet side of one of the first interior evaporator 14 and the first equipment evaporator 16, a non-illustrated evaporating pressure regulating valve for regulating the pressure in the one evaporator to a desired pressure is provided. As a result, the pressures of the refrigerant in the first interior evaporator 14 and the first equipment evaporator 16 can be adjusted in accordance with the respective thermal loads.

The door side air conditioner 10X is provided with the first cabin side on-off valve 17 and the first equipment side on-off valve 18. The first cabin side on-off valve 17 and the first equipment side on-off valve 18 function as a flow path switch valve that switches the flow path of the refrigerant having passed through the first radiator 12. Each of the first cabin side on-off valve 17 and the first equipment side on-off valve 18 is a solenoid valve, and is controlled in accordance with a control signal from the controller 100 described later.

The first cabin side on-off valve 17 is provided in a refrigerant pipe that guides the refrigerant having passed through the first radiator 12 to the first interior expansion valve 13. The first cabin side on-off valve 17 is a switching unit that switches between a state of permitting the flow of the refrigerant to the first interior evaporator 14 and a state of blocking the flow of the refrigerant in the first interior evaporator 14.

The first equipment side on-off valve 18 is provided in a refrigerant pipe that guides the refrigerant having passed through the first radiator 12 to the first equipment expansion valve 15. The first equipment side on-off valve 18 is a panel side switching unit that switches between a first permitted state of permitting the flow of the refrigerant to the first equipment evaporator 16 and a first blocked state of blocking the flow of the refrigerant to the first equipment evaporator 16.

A cooling circuit 31A of the cooler 30 is provided with the circulation pump 32, the heat medium flow path 162 of the first equipment evaporator 16, the heat medium flow path 262 of the second equipment evaporator 26, the three-way valve 33, the battery cooling unit 34, and the radiator 35. Downstream of the circulation pump 32 in the cooling circuit 31A, the first equipment evaporator 16 and the second equipment evaporator 26 are connected in series with respect to the heat medium flow.

Specifically, the first equipment evaporator 16 is disposed on the downstream side, in the heat medium flow, of the second equipment evaporator 26 in the cooling circuit 31A such that the heat medium having passed through the second equipment evaporator 26 flows into the first equipment evaporator 16. That is, the heat medium inlet side of the first equipment evaporator 16 is connected to the outlet side of the second equipment evaporator 26.

In the air conditioning system 1 configured as described above, the controller 100 controls the respective cabin side on-off valves 17 and 27 and the respective equipment side on-off valves 18 and 28 to change the flows of the refrigerant in the door side air conditioner 10X and the panel side air conditioner 20X. As a result, the operation modes of the air conditioning system 1 are switched.

The controller 100 of the present embodiment controls the respective on-off valves 17, 18, 27, and 28 such that, during the interior cooling, the first cabin side on-off valve 17 and the second cabin side on-off valve 27 are opened and the first equipment side on-off valve 18 and the second equipment side on-off valve 28 are closed.

In addition, the controller 100 controls the respective on-off valves 17, 18, 27, and 28 such that, during the equipment temperature control, the first cabin side on-off valve 17, the second cabin side on-off valve 27, the first equipment side on-off valve 18, and the second equipment side on-off valve 28 are each opened.

Figure 16:
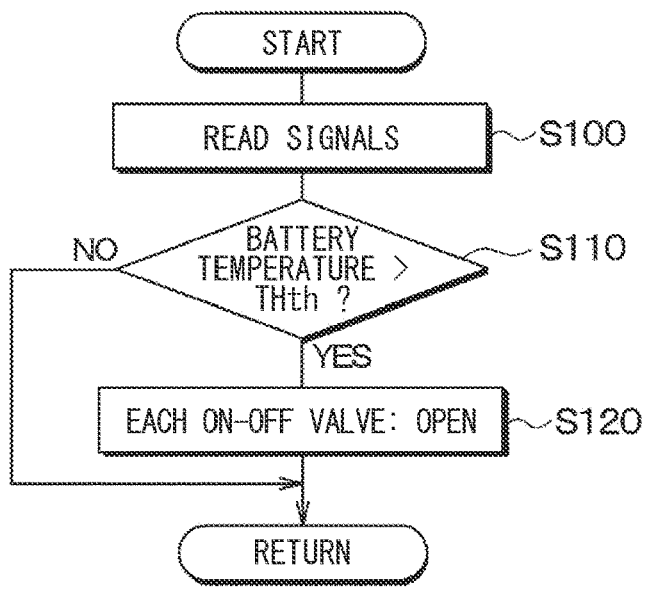
FIG. 16 is a flow chart showing a flow of processing executed by a controller of the air conditioning system of the fourth embodiment when starting a device temperature control.

The controller 100 executes, for example, the processing illustrated in FIG. 16 when the equipment temperature control is started. This processing is a part of start processing to be executed for the equipment temperature control. The control routine illustrated in FIG. 16 is executed periodically or irregularly by the controller 100.

As illustrated in FIG. 16, the controller 100 reads, in a step S100, various signals input from the group of sensors 101, the operation panel 102, or the like. Subsequently, the controller 100 determines in a step S110 whether or not the temperature of the battery BT is higher than a predetermined high-temperature side threshold THth. The high-temperature side threshold THth is set to a temperature at which it is desirable to start the cooling of the battery BT. The high-temperature side threshold THth is set, for example, to the upper limit of the appropriate temperature of the battery BT. Note that the determination processing of the step S110 may be different from that described above.

When the temperature of the battery BT is higher than the high-temperature side threshold THth, the controller 100 switches, in a step S120, each of the first equipment side on-off valve 18 and the second equipment side on-off valve 28 to an opened state at substantially the same timing.

After controlling the respective equipment side on-off valves 18 and 28, the controller 100 exits the present processing. When the temperature of the battery BT is equal to or lower than the high-temperature side threshold THth in the step S110, the controller 100 skips the step S120 and exits the present processing.

Figure 17:
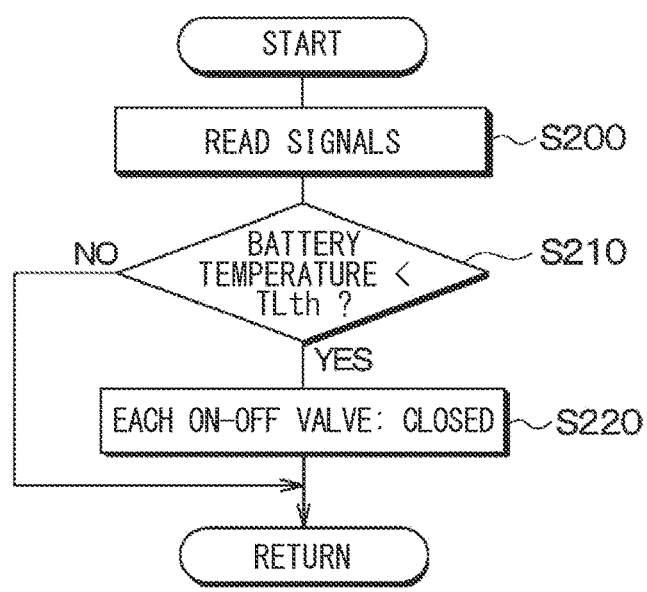
FIG. 17 is a flow chart showing a flow of processing executed by the controller of the air conditioning system of the fourth embodiment when stopping the device temperature control.

The controller 100 also executes, for example, the processing illustrated in FIG. 17 when the equipment temperature control is stopped. This processing is a part of stop processing to be executed during the equipment temperature control. The control routine illustrated in FIG. 17 is executed periodically or irregularly by the controller 100.

As illustrated in FIG. 17, the controller 100 reads, in a step S200, various signals input from the group of sensors 101, the operation panel 102, or the like. Subsequently, the controller 100 determines in a step S210 whether or not the temperature of the battery BT is lower than a predetermined low-temperature side threshold TLth. The low-temperature side threshold TLth is set to a temperature at which it is desirable to stop the cooling of the battery BT. The low-temperature side threshold TLth is set, for example, to the lower limit of the appropriate temperature of the battery BT. Note that the determination processing of the step S210 may be different from that described above.

When the temperature of the battery BT is lower than the low-temperature side threshold TLth, the controller 100 controls, in a step S220, each of the first equipment side on-off valve 18 and the second equipment side on-off valve 28 such that the respective equipment side on-off valves 18 and 28 are closed at substantially the same timing.

After controlling the respective equipment side on-off valves 18 and 28, the controller 100 exits the present processing. When the temperature of the battery BT is equal to or higher than the low-temperature side threshold TLth in the step S210, the controller 100 skips the step S220 and exits the present processing.

When the above processing is executed, the refrigerant having flowed out of the first radiator 12 flows into the first interior expansion valve 13 and the first equipment expansion valve 15 during the equipment temperature control in the door side air conditioner 10X.

The refrigerant having flowed into the first interior expansion valve 13 is decompressed to a desired pressure by the first interior expansion valve 13, and then flows into the first interior evaporator 14. The refrigerant having flowed into the first interior evaporator 14 absorbs heat from the blown air from the first interior fan 141 and evaporates. As a result, the air cooled to a desired temperature by the first interior evaporator 14 is blown out to the door side zone Zd.

On the other hand, the refrigerant having flowed into the first equipment expansion valve 15 is decompressed to a desired pressure by the first equipment expansion valve 15, and then flows into the first equipment evaporator 16. The refrigerant having flowed into the first equipment evaporator 16 absorbs heat from the heat medium flowing in the cooling circuit 31A and evaporates. As a result, the heat medium flowing in the cooling circuit 31A is cooled when passing through the heat medium flow path 162 of the first equipment evaporator 16.

The refrigerant having passed through the first interior evaporator 14 and the refrigerant having passed through the first equipment evaporator 16 are sucked into the first compressor 11. The refrigerant having been sucked into the first compressor 11 is compressed by the first compressor 11 until the refrigerant becomes a high-pressure refrigerant again.

Here, the heat medium cooled by the first equipment evaporator 16 flows to the battery cooling unit 34 and absorbs heat from the battery BT. As a result, the battery BT is cooled. That is, during the equipment temperature control, the battery BT is cooled by utilizing an endothermic action in the first equipment evaporator 16, not only in the second equipment evaporator 26.

During the equipment temperature control, the air cooled by the respective interior evaporators 14 and 24 are blown out to the respective zones Zd and Zp, and the heat medium cooled by the respective equipment evaporators 16 and 26 is supplied to the battery cooling unit 34, as described above. As a result, the cooling of the interior and the cooling of the battery BT can be performed.

Other configurations are the same as those of the first embodiment. The air conditioning system 1 of the present embodiment can obtain effects exerted from a configuration common to or equivalent to that of the first embodiment, similarly to the first embodiment.

In the air conditioning system 1 of the present embodiment, the first equipment evaporator 16 and the second equipment evaporator 26 are disposed, in the cooling circuit 31A, in series with respect to the heat medium flow. According to this, the heat medium cooled by the respective equipment evaporators 16 and 26 is supplied to the battery cooling unit 34, so that the battery BT can be sufficiently cooled.

In particular, the first equipment evaporator 16 is disposed on the downstream side, in the heat medium flow, of the second equipment evaporator 26 in the cooling circuit 31 such that the heat medium having passed through the second equipment evaporator 26 flows into the first equipment evaporator 16. According to this, the heat medium having a lower temperature than that of the heat medium flowing into the second equipment evaporator 26 flows into the first equipment evaporator 16. As a result, a temperature difference between the temperatures of the heat medium before and after the evaporator becomes smaller in the first equipment evaporator 16 than in the second equipment evaporator 26. Therefore, the amount of the heat absorbed from the heat medium during the equipment temperature control is smaller in the first equipment evaporator 16 than in the second equipment evaporator 26.

Figure 18:
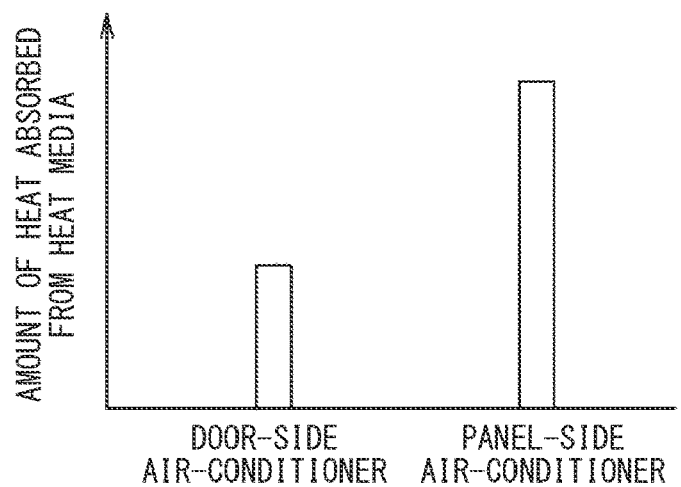
FIG. 18 is an explanatory diagram for explaining a difference between the door-side air conditioner and the panel-side air conditioner of the air conditioning system of the fourth embodiment.

Therefore, in the door side air conditioner 10X, the amount of the heat absorbed from the heat medium during the equipment temperature control is smaller than in the panel side air conditioner 20X, as illustrated in FIG. 18. As a result, the amount of the heat absorbed from the air blowing out to the door side zone Zd increases, and the temperature of the door side zone Zd can be sufficiently lowered. Therefore, even when the battery BT is cooled, comfort in the door side zone Zd near the doors D1 and D2 of the bus vehicle V can be ensured. That is, according to the air conditioning system 1, it is possible to ensure comfort in the air conditioning zone Z that cannot be ventilated due to opening and closing of the platforms E1 and E2 by the passenger doors.

Modification of Fourth Embodiment

Figure 19:
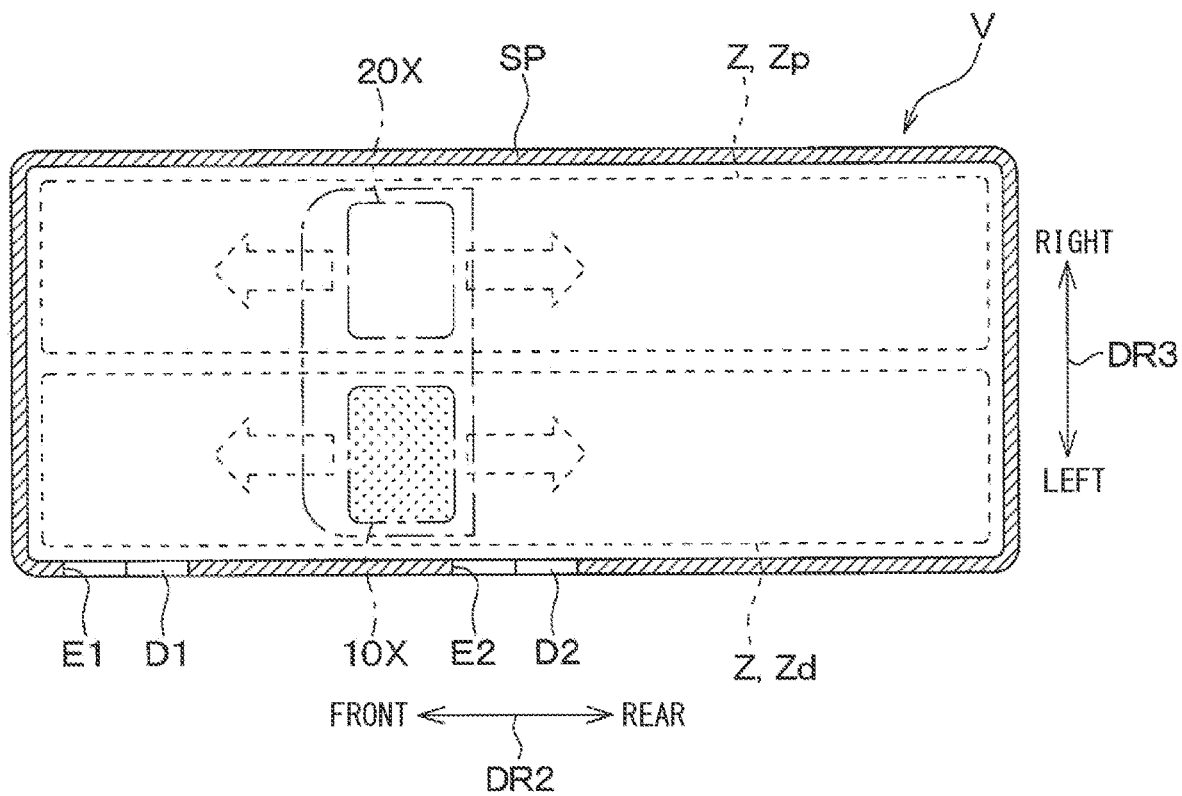
FIG. 19 is an explanatory diagram for explaining a first modification of the bus vehicle to which the air conditioning system of the fourth embodiment is applied.
Figure 20:
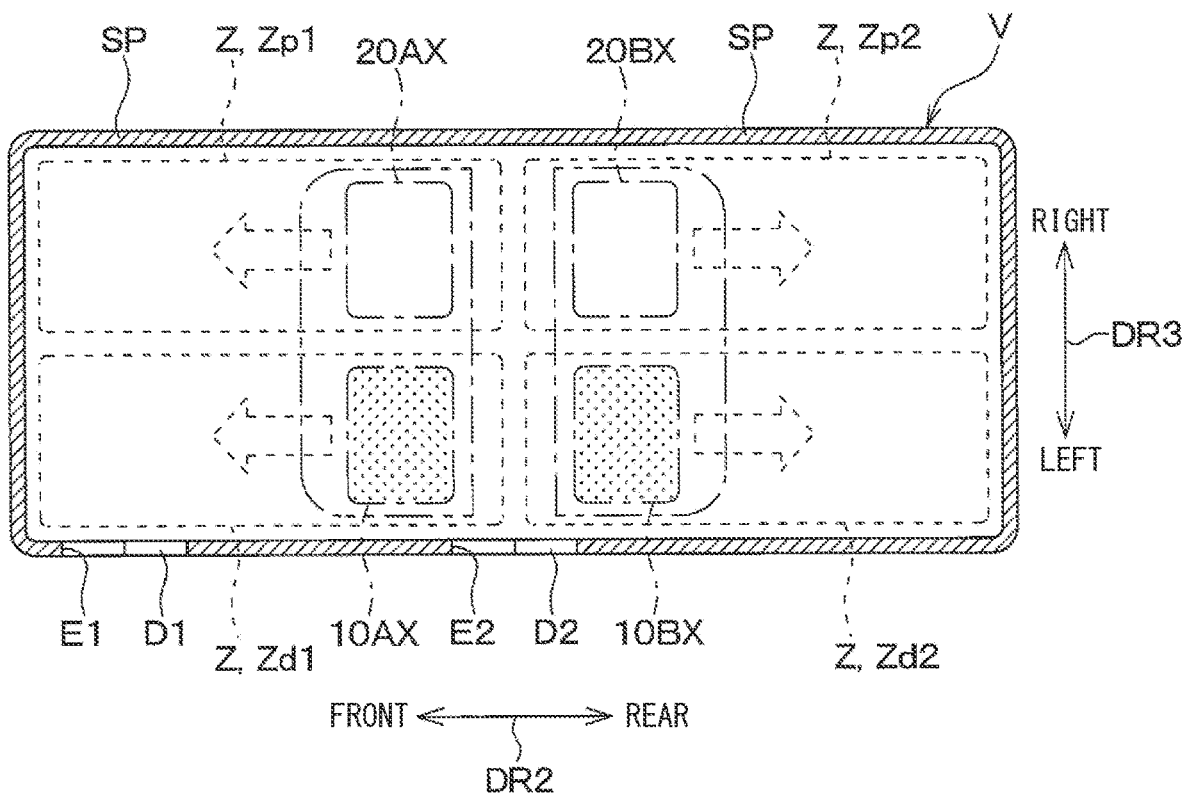
FIG. 20 is an explanatory diagram for explaining a second modification of the bus vehicle to which the air conditioning system of the fourth embodiment is applied.
Figure 21:
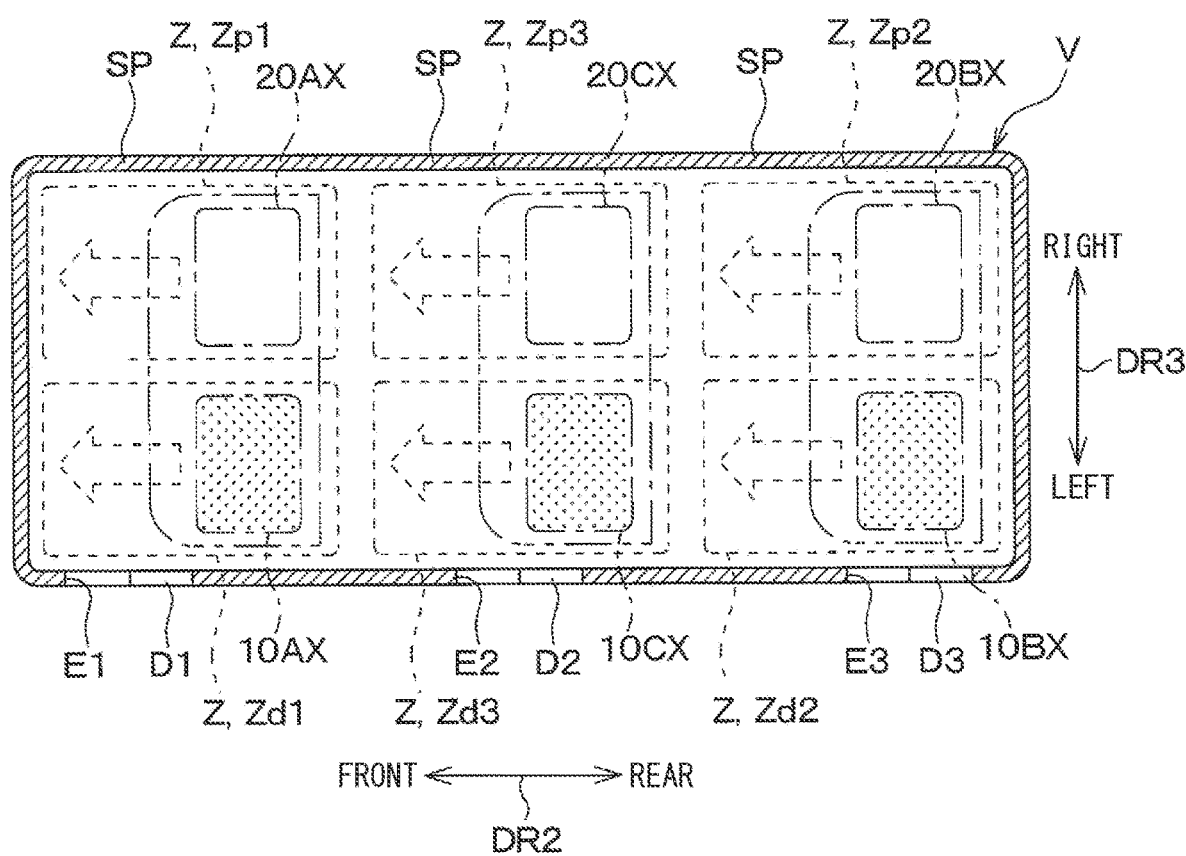
FIG. 21 is an explanatory diagram for explaining a third modification of the bus vehicle to which the air conditioning system of the fourth embodiment is applied.

Although the bus vehicle V to which the air conditioning system 1 is applied has not been particularly described in the fourth embodiment, the bus vehicle V may be configured, for example, similarly to the first embodiment, as illustrated in FIG. 19. Alternatively, the bus vehicle V may be configured similarly to the second embodiment, as illustrated in FIG. 20, or may be configured similarly to the third embodiment, as illustrated in FIG. 21. Note that the bus vehicle V may be configured similarly to what is: configured according to the modification of the first embodiment; configured according to the modification of the second embodiment; described in the modification of the third embodiment; or the like. The same applies to the following embodiments.

Fifth Embodiment

Next, a fifth embodiment will be described with reference to FIGS. 22 and 23. In the present embodiment, differences from the fourth embodiment will be mainly described.

Figure 22:
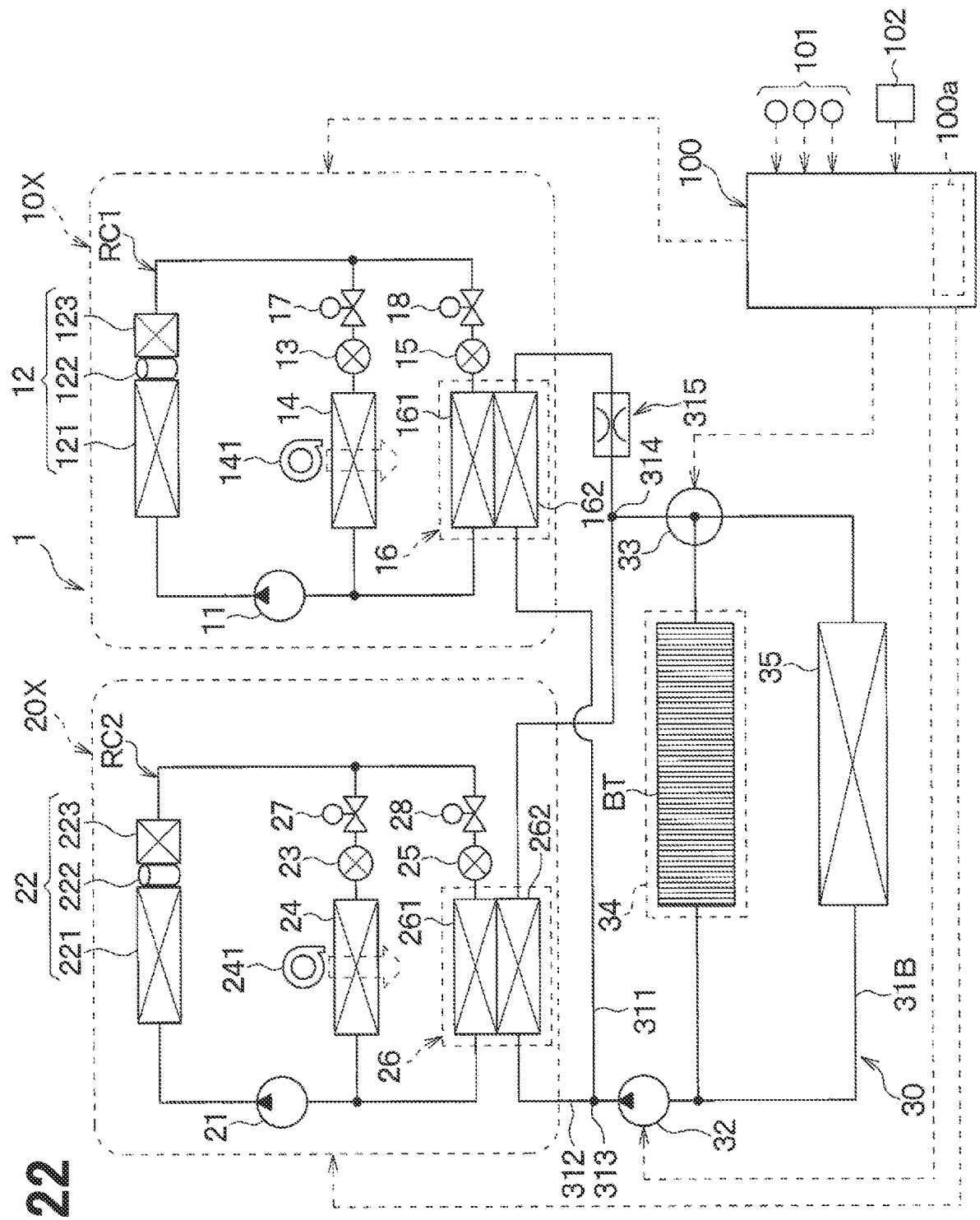
FIG. 22 is a schematic configuration diagram of an air conditioning system according to a fifth embodiment.
Figure 23:
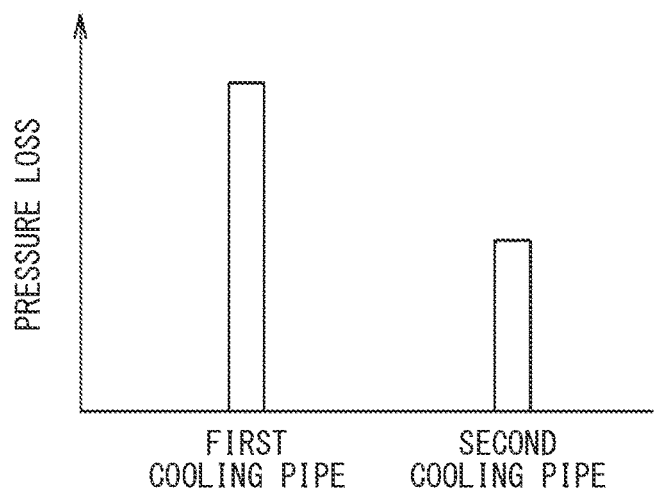
FIG. 23 is an explanatory diagram for explaining a difference between a first cooling pipe and a second cooling pipe of the air conditioning system of the fifth embodiment.

Downstream of the circulation pump 32 in a cooling circuit 31B of the cooler 30, the first equipment evaporator 16 and the second equipment evaporator 26 are connected in parallel with respect to the heat medium flow, as illustrated in FIG. 22.

The cooling circuit 31B includes a first cooling pipe 311 that allows the heat medium to flow toward the first equipment evaporator 16 and a second cooling pipe 312 that allows the heat medium to flow toward the second equipment evaporator 26. The cooling circuit 31B branches, downstream of the circulation pump 32, into two parts of the first cooling pipe 311 and the second cooling pipe 312. The branched first cooling pipe 311 and second cooling pipe 312 are merged together before the three-way valve 33.

Specifically, the first cooling pipe 311 and the second cooling pipe 312 are connected to a branch portion 313 provided on the upstream side, in the heat medium flow, of the first equipment evaporator 16 and the second equipment evaporator 26. This branch portion 313 is provided downstream of the circulation pump 32.

The first cooling pipe 311 and the second cooling pipe 312 are connected to a merge portion 314 provided on the downstream side, in the heat medium flow, of the first equipment evaporator 16 and the second equipment evaporator 26. The merge portion 314 is provided upstream of the three-way valve 33.

The first cooling pipe 311 has a structure in which a pressure loss, occurring when the heat medium flows, is larger than that of the second cooling pipe 312. Specifically, the first cooling pipe 311 is provided with a resistor 315 that obstructs the flow of the heat medium so as to make the pressure loss larger than that of the second cooling pipe 312. The resistor 315 can include, for example, an orifice, a capillary tube, or the like. The resistor 315 is provided downstream of the first equipment evaporator 16 in the first cooling pipe 311. Note that the resistor 315 may be provided upstream of the first equipment evaporator 16 in the first cooling pipe 311, or may be formed integrally with the first equipment evaporator 16.

Other configurations are the same as those of the fourth embodiment. The air conditioning system 1 of the present embodiment can obtain effects exerted from a configuration common to or equivalent to that of the fourth embodiment, similarly to the fourth embodiment.

In the air conditioning system 1 of the present embodiment, the first equipment evaporator 16 and the second equipment evaporator 26 are disposed, in the cooling circuit 31B, in parallel with respect to the heat medium flow. According to this, the heat medium cooled by the respective equipment evaporators 16 and 26 is supplied to the battery cooling unit 34, so that the battery BT can be sufficiently cooled.

In particular, the first cooling pipe 311 is provided with the resistor 315, unlike the second cooling pipe 312. As a result, the first cooling pipe 311 has a larger pressure loss than the second cooling pipe 312, as illustrated in FIG. 23.

In the first cooling pipe 311 configured as described above, the flow rate of the heat medium is smaller than that of the second cooling pipe 312. As a result, the amount of the heat absorbed from the heat medium is smaller in the first equipment evaporator 16 than in the second equipment evaporator 26.

Therefore, the amount of the heat absorbed from the heat medium during the equipment temperature control is small in the door side air conditioner 10X. As a result, the amount of the heat absorbed from the air blowing out to the door side zone Zd increases, and the temperature of the door side zone Zd can be sufficiently lowered. Therefore, even when the battery BT is cooled, comfort in the door side zone Zd near the doors D1 and D2 of the bus vehicle V can be ensured. That is, according to the air conditioning system 1, it is possible to ensure comfort in the air conditioning zone Z where ventilation loss due to opening and closing of the platforms E1 and E2 by the passenger doors easily occurs.

Modification of Fifth Embodiment

In the fifth embodiment, what realizes a structure in which the pressure loss of the first cooling pipe 311 is increased by adding the resistor 315 to the first cooling pipe 311 has been described as an example. However, the structure may be realized by other means.

Figure 24:
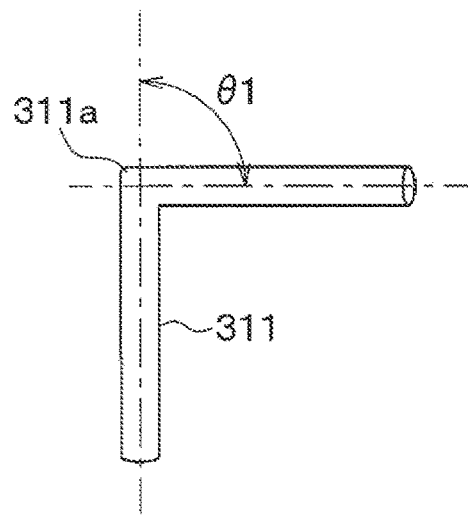
FIG. 24 is a schematic diagram showing a first cooling pipe used in a cooling circuit, in a first modification of the air conditioning system of the fifth embodiment.
Figure 25:
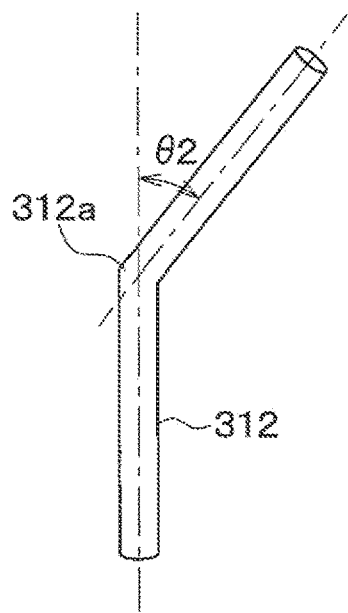
FIG. 25 is a schematic diagram showing a second cooling pipe used in a cooling circuit, in the first modification of the air conditioning system of the fifth embodiment.
Figure 26:
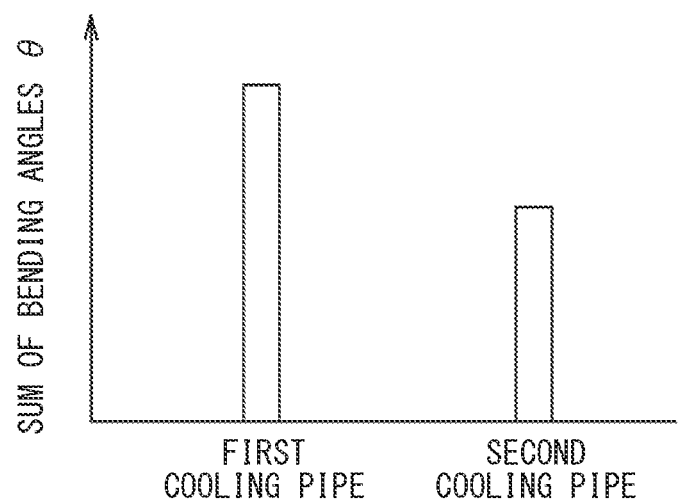
FIG. 26 is an explanatory diagram for explaining a difference between the first cooling pipe and the second cooling pipe, in the first modification of the air conditioning system of the fifth embodiment.

The above structure may be realized by, for example, making a bending angle θ1 of a bent portion 311a of the pipe in the first cooling pipe 311 larger than a bending angle θ2 of a bent portion 312a of the pipe in the second cooling pipe 312, as illustrated in FIGS. 24 and 25. Note that a structure may be realized in which the pressure loss of the first cooling pipe 311 is made larger by making the sum of the bending angles θ1 of the first cooling pipes 311 larger than the sum of the bending angles θ2 of the second cooling pipes 312, as illustrated in FIG. 26.

Figure 27:
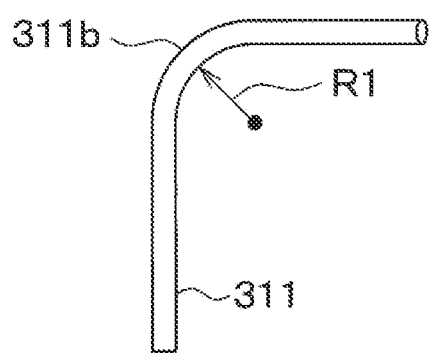
FIG. 27 is a schematic diagram showing a first cooling pipe used in a cooling circuit, in a second modification of the air conditioning system of the fifth embodiment.
Figure 28:
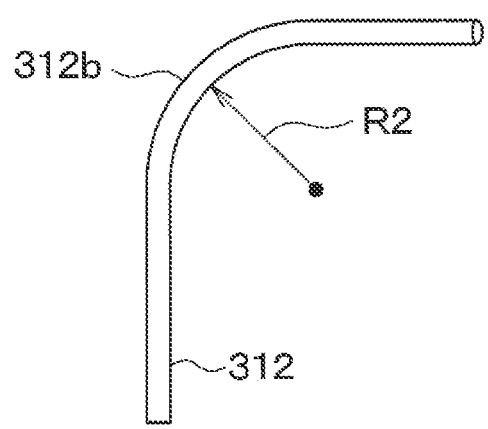
FIG. 28 is a schematic diagram showing a second cooling pipe used in the cooling circuit, in the second modification of the air conditioning system of the fifth embodiment.

Alternatively, the above structure may be realized by, for example, making a curvature radius R1 of an arc-shaped bent portion 311b in the first cooling pipe 311 smaller than a curvature radius R2 of an arc-shaped bent portion 312b in the second cooling pipe 312, as illustrated in FIGS. 27 and 28.

Figure 29:
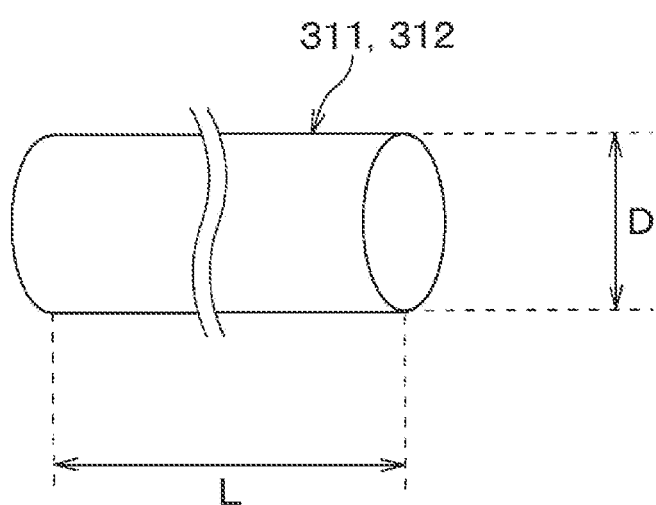
FIG. 29 is a schematic diagram showing a cooling pipe used in a cooling circuit, in a third modification of the air conditioning system of the fifth embodiment.
Figure 30:
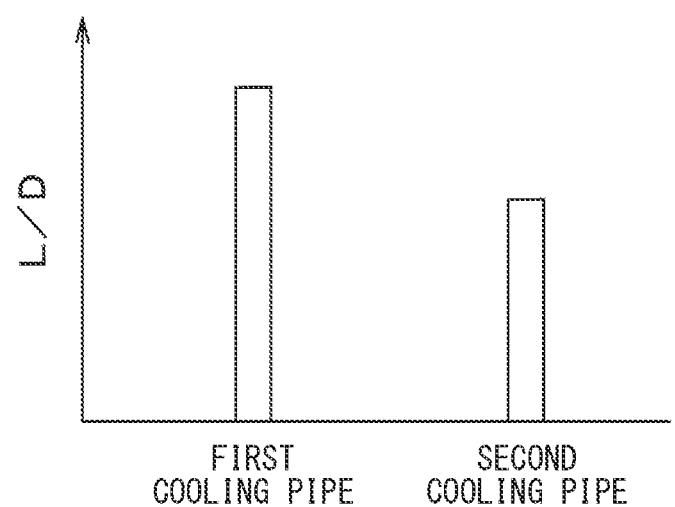
FIG. 30 is an explanatory diagram for explaining a difference between the first cooling pipe and the second cooling pipe in the third modification of the air conditioning system of the fifth embodiment.

Furthermore, the above structure may be realized by, for example, adopting a structure in which an effective length L/D indicated as a ratio of a pipe length to a pipe inner diameter is larger in the first cooling pipe 311 than in the second cooling pipe 312, as illustrated in FIGS. 29 and 30.

Sixth Embodiment

Next, a sixth embodiment will be described with reference to FIGS. 31 and 32. In the present embodiment, differences from the fourth embodiment will be mainly described.

Figure 31:
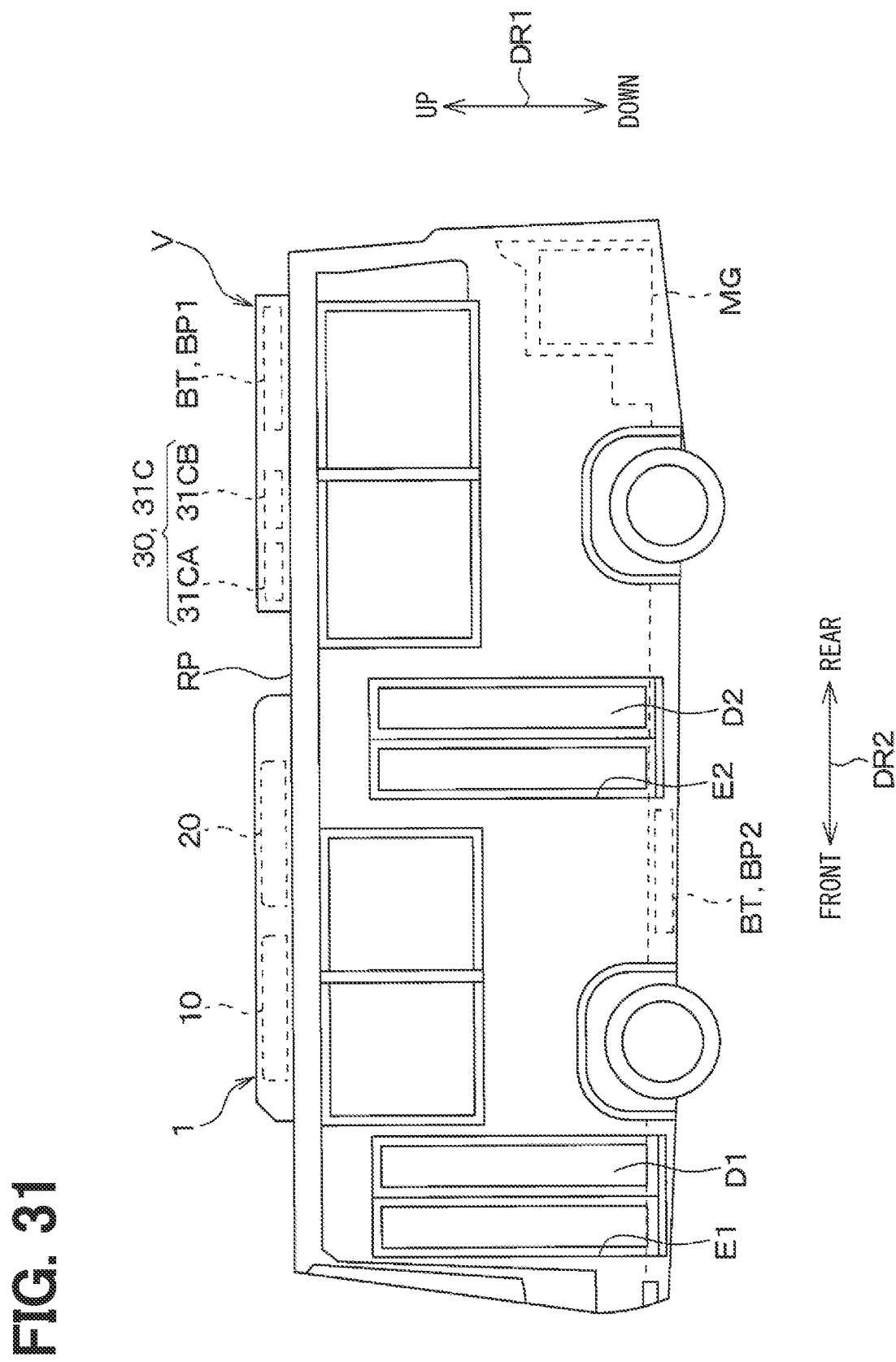
FIG. 31 is a schematic diagram of a bus vehicle to which an air conditioning system of a sixth embodiment is applied.

In the bus vehicle V, the battery BT is disposed in each of the ceiling portion and an underfloor portion, as illustrated in FIG. 31. That is, the battery BT includes a first battery pack BP1 disposed in the ceiling portion of the bus vehicle V and a second battery pack BP2 disposed in the underfloor portion of the bus vehicle V.

Each of the first battery pack BP1 and the second battery pack BP2 includes a series connection body in which battery cells are electrically connected in series. Note that, in the first battery pack BP1 and the second battery pack BP2, some of the plurality of battery cells may be connected in parallel.

In the battery BT, the number of the battery cells is smaller in the second battery pack BP2 than in the first battery pack BP1. That is, in the bus vehicle V, the number of the battery cells is smaller in the underfloor portion than in the ceiling portion. The first battery pack BP1 has a larger number of the battery cells than the second battery pack BP2, and thus has a larger heat capacity. In the present embodiment, the first battery pack BP1 constitutes ceiling side equipment disposed on the ceiling side of the vehicle, and the second battery pack BP2 constitutes underfloor side equipment disposed in the underfloor portion of the vehicle.

Figure 32:
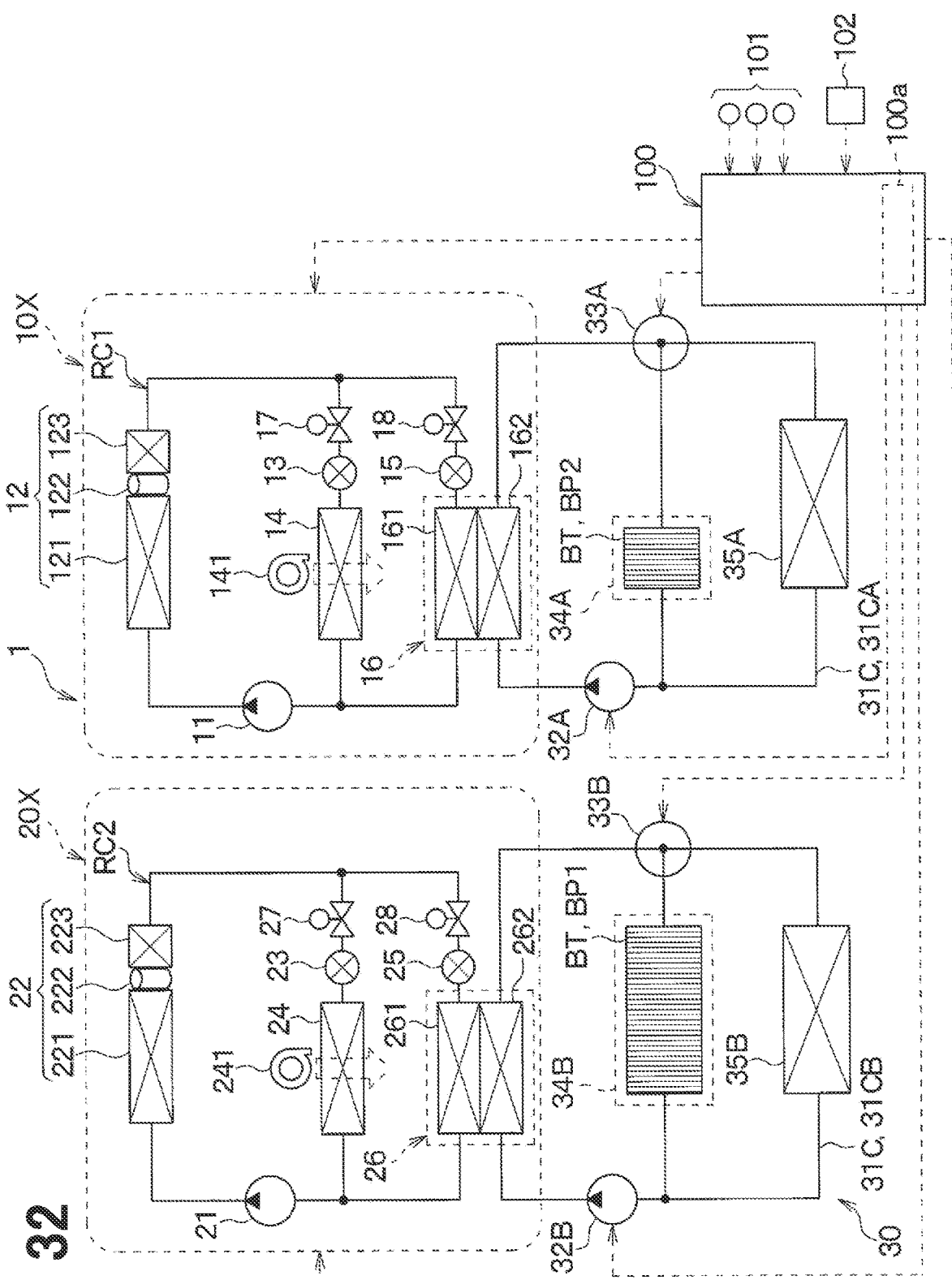
FIG. 32 is a schematic configuration diagram of the air conditioning system of the sixth embodiment.

As illustrated in FIG. 32, a cooling circuit 31C of the cooler 30 includes a first circuit unit 31CA and a second circuit unit 31CB that are independent of each other. That is, the first circuit unit 31CA and the second circuit unit 31CB are configured as circuits independent of each other.

The first circuit unit 31CA is a circuit in which the heat medium for exchanging heat with the second battery pack BP2 disposed in the underfloor portion flows. The first circuit unit 31CA includes the heat medium flow path 162 of the first equipment evaporator 16. In other words, the first equipment evaporator 16 is disposed in the first circuit unit 31CA such that the heat medium flowing in the first circuit unit 31CA passes therethrough. Specifically, the first circuit unit 31CA includes a first circulation pump 32A, the heat medium flow path 162 of the first equipment evaporator 16, a first three-way valve 33A, a first battery cooling unit 34A, and a first radiator 35A.

The second circuit unit 31CB is a circuit in which the heat medium for exchanging heat with the first battery pack BP1 disposed in the ceiling portion flows. The second circuit unit 31CB includes the heat medium flow path 262 of the second equipment evaporator 26. In other words, the second equipment evaporator 26 is disposed in the second circuit unit 31CB such the heat medium flowing in the second circuit unit 31CB passes therethrough. Specifically, the second circuit unit 31CB includes a second circulation pump 32B, the heat medium flow path 262 of the second equipment evaporator 26, a second three-way valve 33B, a second battery cooling unit 34B, and a second radiator 35B. The second circuit unit 31CB is disposed in the ceiling portion, similarly to the first battery pack BP1. On the other hand, in the first circuit unit 31CA, the first battery cooling unit 34A is disposed in the underfloor portion, similarly to the second battery pack BP2, and the other configurations are disposed in the ceiling portion. Therefore, a length from the heat medium flow path 162 of the first equipment evaporator 16 to the first battery cooling unit 34A is longer than a length from the second equipment evaporator 26 to the second battery cooling unit 34B.

Here, the first circulation pump 32A and the second circulation pump 32B are configured similarly to the circulation pump 32 described in the first embodiment. The first three-way valve 33A and the second three-way valve 33B are configured similarly to the three-way valve 33 described in the first embodiment. The first battery cooling unit 34A and the second battery cooling unit 34B are configured similarly to the battery cooling unit 34 described in the first embodiment. The first radiator 35A and the second radiator 35B are configured similarly to the radiator 35 described in the first embodiment.

Other configurations are the same as those of the fourth embodiment. The air conditioning system 1 of the present embodiment can obtain effects exerted from a configuration common to or equivalent to that of the fourth embodiment, similarly to the fourth embodiment.

The cooling circuit 31C of the present embodiment includes the first circuit unit 31CA and the second circuit unit 31CB that are independent of each other. The first equipment evaporator 16 is disposed in the first circuit unit 31CA such that the heat medium flowing in the first circuit unit 31CA passes therethrough. The second equipment evaporator 26 is disposed in the second circuit unit 31CB such that the heat medium flowing in the second circuit unit 31CB passes therethrough. When the cooling circuit 31C is configured such that the amount of the heat absorbed in the first equipment evaporator 16 and the amount of the heat absorbed in the second equipment evaporator 26 can be independently adjusted as described above, the battery BT can be sufficiently cooled by the heat medium cooled by the respective equipment evaporators 16 and 26.

In particular, the cooling circuit 31C has a circuit configuration in which the heat medium for exchanging heat with the first battery pack BP1 disposed in the ceiling portion flows in the second circuit unit 31CB, and the heat medium for exchanging heat with the second battery pack BP2 disposed in the underfloor portion flows in the first circuit unit 31CA.

In the bus vehicle V, the temperature of the first battery pack BP1 disposed in the ceiling portion is likely to be higher than that of the second battery pack BP2 disposed in the underfloor portion due to the influence of solar radiation, natural convection, and the like. In other words, the temperature of the second battery pack BP2 is less likely to be higher than that of the first battery pack BP1 due to the influence of solar radiation, natural convection, and the like.

Therefore, when the heat medium for exchanging heat with the first battery pack BP1 flows in the second circuit unit 31CB and the heat medium for exchanging heat with the second battery pack BP2 flows in the first circuit unit 31CA, the heat medium having a lower temperature than that of the heat medium flowing into the second equipment evaporator 26 flows into the first equipment evaporator 16. As a result, a temperature difference between the temperatures of the heat medium before and after the evaporator is smaller in the first equipment evaporator 16 than in the second equipment evaporator 26. In addition, the length from the first equipment evaporator 16 to the first battery cooling unit 34A is longer than the length from the second equipment evaporator 26 to the second battery cooling unit 34B. As a result, the flow rate of the heat medium is likely to be smaller in the first equipment evaporator 16 than in the second equipment evaporator 26. Therefore, the amount of the heat absorbed from the heat medium during the equipment temperature control is likely to be smaller in the door side air conditioner 10X than in the panel side air conditioner 20X.

In addition, the first battery pack BP1 has a larger number of the battery cells than the second battery pack BP2, and thus has a larger heat capacity. According to this, the temperature of the second battery pack BP2 is likely to be lower than that of the first battery pack BP1. As a result, during the equipment cooling, the heat medium having a lower temperature than that of the heat medium flowing into the second equipment evaporator 26 is likely to flow into the first equipment evaporator 16. As a result, a temperature difference between the temperatures of the heat medium before and after the evaporator is smaller in the first equipment evaporator 16 than in the second equipment evaporator 26. Therefore, the amount of the heat absorbed from the heat medium during the equipment temperature control is sufficiently smaller in the first equipment evaporator 16 than in the second equipment evaporator 26.

Furthermore, the cooling circuit 31C is configured such that the number of the battery cells that are allowed to exchange heat with the heat medium is smaller in the first circuit unit 31CA than in the second circuit unit 31CB. According to this, the first circuit unit 31CA has a smaller number of the battery cells to be cooled, and the temperature of the heat medium is likely to be lower in the first circuit unit 31CA than in the second circuit unit 31CB. Therefore, during the equipment cooling, the heat medium having a lower temperature than that of the heat medium flowing into the second equipment evaporator 26 is likely to flow into the first equipment evaporator 16. As a result, a temperature difference between the temperatures of the heat medium before and after the evaporator is smaller in the first equipment evaporator 16 than in the second equipment evaporator 26. Therefore, the amount of the heat absorbed from the heat medium during the equipment temperature control is sufficiently smaller in the first equipment evaporator 16 than in the second equipment evaporator 26.

Therefore, the amount of the heat absorbed from the heat medium during the equipment temperature control is small in the door side air conditioner 10X. As a result, the amount of the heat absorbed from the air blowing out to the door side zone Zd increases, and the temperature of the door side zone Zd can be sufficiently lowered. Therefore, even when the battery BT is cooled, comfort in the door side zone Zd near the doors D1 and D2 of the bus vehicle V can be ensured. That is, according to the air conditioning system 1, it is possible to ensure comfort in the air conditioning zone Z where ventilation loss due to opening and closing of the platforms E1 and E2 by the passenger doors easily occurs.

Modification of Sixth Embodiment

As long as a configuration is adopted in which the amount of the heat absorbed from the heat medium during the equipment temperature control is smaller in the first equipment evaporator 16 than in the second equipment evaporator 26, the air conditioning system 1 may have a different configuration from that of the sixth embodiment. For example, the first battery pack BP1 and the second battery pack BP2 may be disposed at the same position. In addition, the first battery pack BP1 and the second battery pack BP2 may include the same number of the battery cells.

Seventh Embodiment

Next, a seventh embodiment will be described with reference to FIGS. 33 and 34. In the present embodiment, differences from the fourth embodiment will be mainly described.

In the air conditioning system 1 of the present embodiment, the controller 100 controls the flow rates of the refrigerant in the respective equipment evaporators 16 and 26 such that the amount of the heat absorbed from the heat medium during the equipment temperature control is smaller in the first equipment evaporator 16 than in the second equipment evaporator 26.

The controller 100 controls the respective equipment side on-off valves 18 and 28 such that, during the equipment temperature control, a time during which the first equipment side on-off valve 18 is opened is shorter than a time during which the second equipment side on-off valve 28 is opened. The time during which the first equipment side on-off valve 18 is opened is a time during which a first permitted state of permitting the flow of the refrigerant to the first equipment evaporator 16 is maintained. The time during which the second equipment side on-off valve 28 is opened is a time during which the second equipment side on-off valve 28 is in a second permitted state of permitting the flow of the refrigerant to the second equipment evaporator 26.

Figure 33:
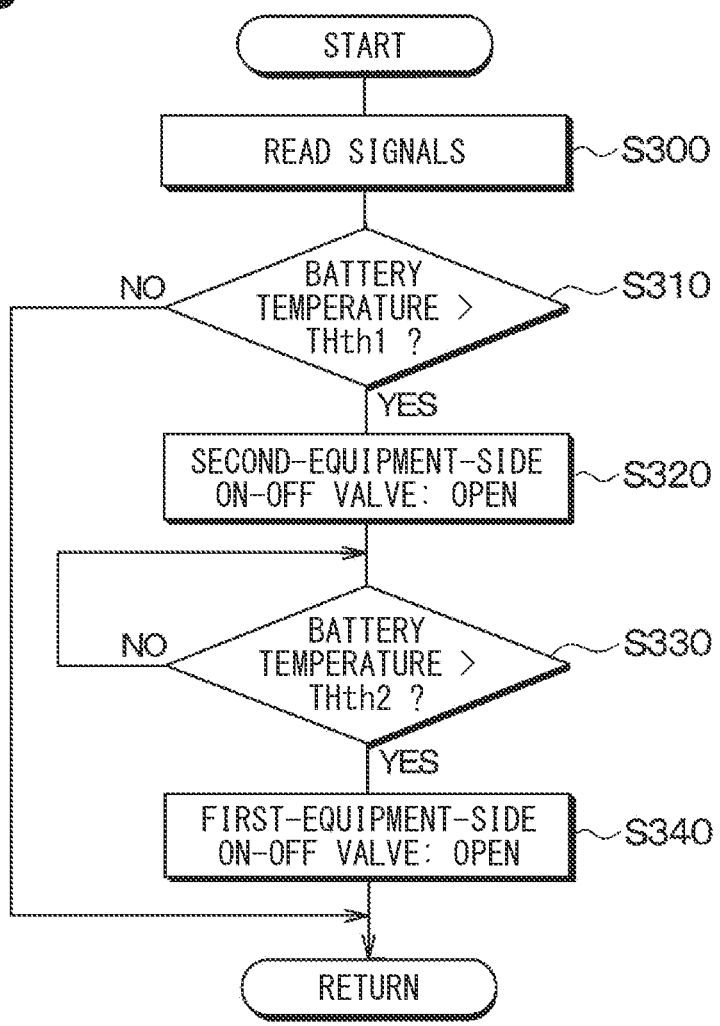
FIG. 33 is a flow chart showing a flow of processing executed by a controller of an air conditioning system of a seventh embodiment when starting a device temperature control.

The controller 100 executes, for example, the processing illustrated in FIG. 33 when the equipment temperature control is started. This processing is a part of start processing to be executed for the equipment temperature control, and corresponds to the processing illustrated in FIG. 16 described in the fourth embodiment. The control routine illustrated in FIG. 33 is executed periodically or irregularly by the controller 100.

As illustrated in FIG. 33, the controller 100 reads, in a step S300, various signals input from the group of sensors 101, the operation panel 102, or the like. Subsequently, the controller 100 determines in a step S310 whether or not the temperature of the battery BT is higher than a first high-temperature side threshold THth1. The first high-temperature side threshold THth1 is set to a temperature at which it is desirable to start the cooling of the battery BT. The first high-temperature side threshold THth1 is set, for example, to a slightly lower temperature than the upper limit of the appropriate temperature of the battery BT.

When the temperature of the battery BT is higher than the first high-temperature side threshold THth1, the controller 100 switches the second equipment side on-off valve 28 to an opened state in a step S320. That is, the controller 100 controls the second equipment side on-off valve 28 such that the second equipment side on-off valve 28 is switched from the second blocked state to the second permitted state.

Subsequently, the controller 100 determines whether or not a first set time elapses since the second equipment side on-off valve 28 is switched to the second permitted state. Specifically, the controller 100 determines in a step S330 whether or not the temperature of the battery BT is higher than a second high-temperature side threshold THth2. The second high-temperature side threshold THth2 is set to a higher temperature than the first high-temperature side threshold THth1. The second high-temperature side threshold THth2 is set, for example, to the upper limit of the appropriate temperature of the battery BT.

When the temperature of the battery BT is higher than the second high-temperature side threshold THth2, the controller 100 switches the first equipment side on-off valve 18 to an opened state in a step S340. That is, the controller 100 controls the first equipment side on-off valve 18 such that the first equipment side on-off valve 18 is switched from the first blocked state to the first permitted state.

After controlling the respective equipment side on-off valves 18 and 28, the controller 100 exits the present processing. In addition, when the temperature of the battery BT is equal to or lower than the first high-temperature side threshold THth1 in the step S310, the controller 100 skips the step S320 to the step S340, and exits the present processing.

Figure 34:
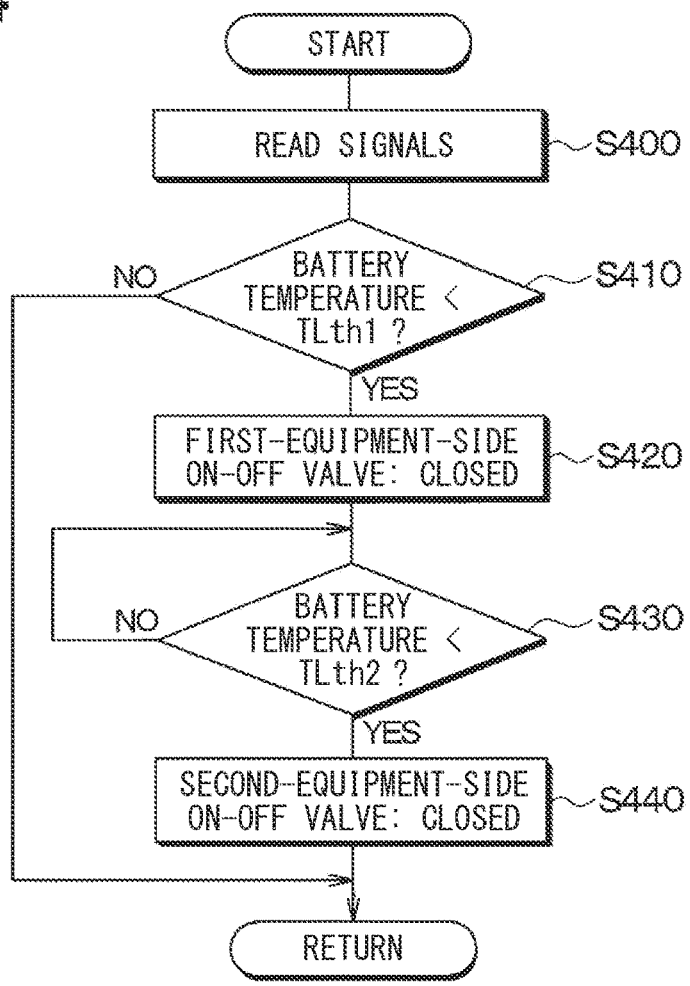
FIG. 34 is a flow chart showing a flow of processing executed by the controller of the air conditioning system of the seventh embodiment when stopping the device temperature control.

The controller 100 also executes, for example, the processing illustrated in FIG. 34 when the equipment temperature control is stopped. This processing is a part of stop processing to be executed during the equipment temperature control, and corresponds to the processing illustrated in FIG. 17 described in the fourth embodiment. The control routine illustrated in FIG. 34 is executed periodically or irregularly by the controller 100.

As illustrated in FIG. 34, the controller 100 reads, in a step S400, various signals input from the group of sensors 101, the operation panel 102, or the like. Subsequently, the controller 100 determines in a step S410 whether or not the temperature of the battery BT is lower than a first low-temperature side threshold TLth1. The first low-temperature side threshold TLth1 is set to a temperature at which it is desirable to stop the cooling of the battery BT. The first low-temperature side threshold TLth1 is set, for example, to a slightly higher temperature than the lower limit of the appropriate temperature of the battery BT.

When the temperature of the battery BT is lower than the first low-temperature side threshold TLth1, the controller 100 switches the first equipment side on-off valve 18 to a closed state in a step S420. That is, the controller 100 controls the first equipment side on-off valve 18 such that the first equipment side on-off valve 18 is switched from the first permitted state to the first blocked state.

Subsequently, the controller 100 determines in a step S430 whether or not a second set time elapses since the first equipment side on-off valve 18 is switched to the first blocked state. Specifically, the controller 100 determines in the step S430 whether or not the temperature of the battery BT is lower than a second low-temperature side threshold TLth2. The second low-temperature side threshold TLth2 is set to a lower temperature than the first low-temperature side threshold TLth1. The second low-temperature side threshold TLth2 is set, for example, to the lower limit of the appropriate temperature of the battery BT.

When the temperature of the battery BT is lower than the second low-temperature side threshold TLth2, the controller 100 switches the second equipment side on-off valve 28 to a closed state in a step S440. That is, the controller 100 controls the second equipment side on-off valve 28 such that the second equipment side on-off valve 28 is switched from the second permitted state to the second blocked state.

After controlling the respective equipment side on-off valves 18 and 28, the controller 100 exits the present processing. In addition, when the temperature of the battery BT is equal to or lower than the first low-temperature side threshold TLth1 in the step S410, the controller 100 skips the step S420 to the step S440, and exits the present processing.

When the above processing is executed, the flow rate of the refrigerant passing through the first equipment evaporator 16 during the equipment temperature control is smaller than the flow rate of the refrigerant passing through the second equipment evaporator 26. That is, during the equipment temperature control, the flow rate of the refrigerant passing through the first interior evaporator 14 is larger than the flow rate of the refrigerant passing through the second interior evaporator 24.

Other configurations are the same as those of the fourth embodiment. The air conditioning system 1 of the present embodiment can obtain effects exerted from a configuration common to or equivalent to that of the fourth embodiment, similarly to the fourth embodiment.

The controller 100 of the present embodiment controls the respective equipment side on-off valves 18 and 28 such that, during the equipment temperature control, a time during which the first equipment side on-off valve 18 is in the first permitted state is shorter than a time during which the second equipment side on-off valve 28 is in the second permitted state. According to this, the flow rate of the refrigerant during the equipment temperature control is smaller in the first equipment evaporator 16 than in the second equipment evaporator 26. As a result, the amount of the heat absorbed from the heat medium during the equipment temperature control can be made smaller in the first equipment evaporator 16 than in the second equipment evaporator 26.

Therefore, the amount of the heat absorbed from the heat medium during the equipment temperature control is small in the door side air conditioner 10X. As a result, the amount of the heat absorbed from the air blowing out to the door side zone Zd increases, and the temperature of the door side zone Zd can be sufficiently lowered. Therefore, even when the battery BT is cooled, comfort in the door side zone Zd near the doors D1 and D2 of the bus vehicle V can be ensured. That is, according to the air conditioning system 1, it is possible to ensure comfort in the air conditioning zone Z where ventilation loss due to opening and closing of the platforms E1 and E2 by the passenger doors easily occurs.

Modification of Seventh Embodiment

In the seventh embodiment, the control processing, in which, during the equipment temperature control, the flow rate of the refrigerant passing through the first equipment evaporator 16 is reduced by shifting the operation timings of the respective equipment side on-off valves 18 and 28 when the equipment temperature control is started and stopped, has been described as an example. However, the control processing is not limited thereto. The control process to be executed by the controller 100 may be another processing as long as, during the equipment temperature control, the flow rate of the refrigerant passing through the first equipment evaporator 16 is reduced. The control processing to be executed by the controller 100 may be configured to reduce, during the equipment temperature control, the flow rate of the refrigerant passing through the first equipment evaporator 16 by, for example, shifting the operation timings of the respective equipment side on-off valves 18 and 28 when the equipment temperature control is either started or stopped.

In addition, the control processing to be executed by the controller 100 described in the seventh embodiment can also be applied to the air conditioning systems 1 described in the fifth embodiment and the sixth embodiment without being limited to that of the fourth embodiment.

Eighth Embodiment

Next, an eighth embodiment will be described with reference to FIGS. 35 to 37. In the present embodiment, differences from the fourth embodiment will be mainly described.

The air conditioning system 1 of the present embodiment has a structure in which a pressure loss, occurring when the refrigerant flows in the refrigeration cycle RC1 of the door side air conditioner 10X, is different from a pressure loss occurring when the refrigerant flows in the refrigeration cycle RC1 of the panel side air conditioner 20.

Figure 35:
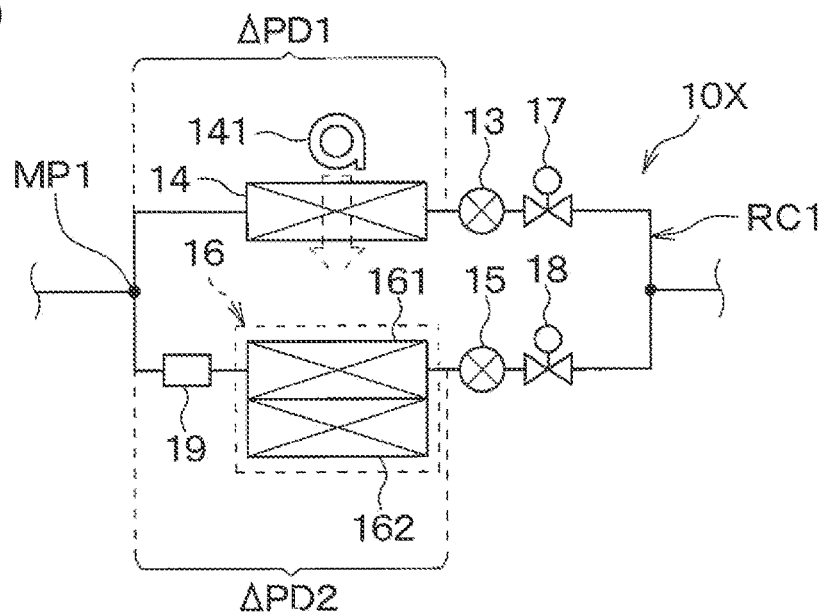
FIG. 35 is a schematic configuration diagram showing a door-side air conditioner of an eighth embodiment.

The door side air conditioner 10X is provided, on the outlet side of the first equipment evaporator 16, with a pressure loss body 19 that obstructs the flow of the refrigerant, as illustrated in FIG. 35. The pressure loss body 19 includes, for example, an orifice or the like. Alternatively, the pressure loss body 19 may be provided in the evaporating pressure regulating valve.

The door side air conditioner 10X is configured similarly to that of the first embodiment. In the present embodiment, a merge place, where the refrigerant having passed through the first interior evaporator 14 and the refrigerant having passed through the first equipment evaporator 16 are merged, is defined as a first merge place MP1. In the present embodiment, the pressure loss from the inlet side of the first interior evaporator 14 to the first merge place MP1 is defined as $\Delta PD1$, and the pressure loss from the inlet side of the first equipment evaporator 16 to the first merge place MP1 is defined as $\Delta PD2$.

Figure 36:
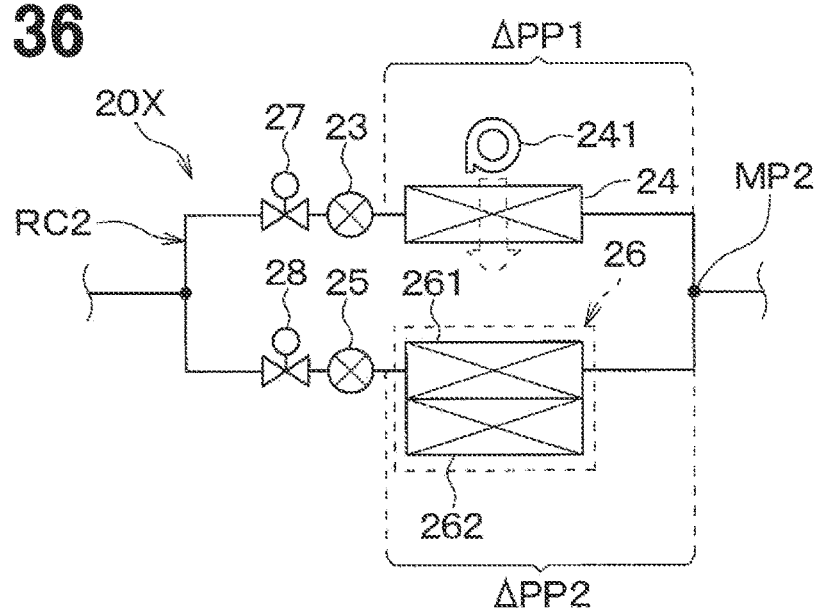
FIG. 36 is a schematic configuration diagram showing a panel-side air conditioner of the eighth embodiment.
Figure 37:
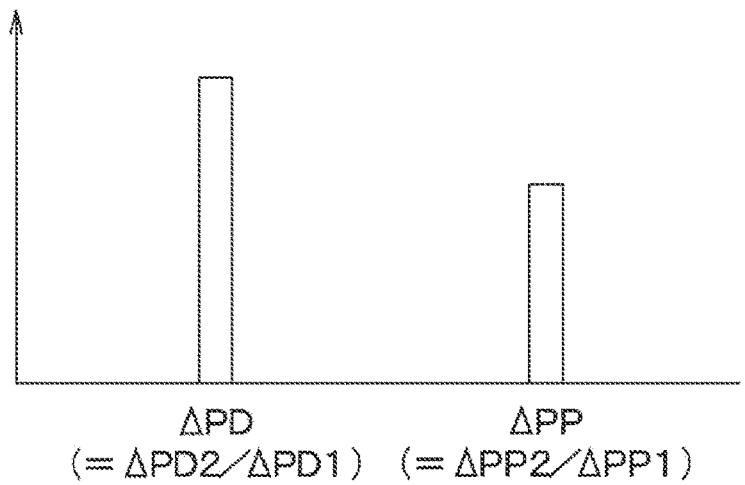
FIG. 37 is an explanatory diagram for explaining pressure loss of the door-side air conditioner and the panel-side air conditioner of the eighth embodiment.

On the other hand, the panel side air conditioner 20X is configured similarly to that of the first embodiment, as illustrated in FIG. 36. In the present embodiment, a merge place, where the refrigerant having passed through the second interior evaporator 24 and the refrigerant having passed through the second equipment evaporator 26 are merged, is defined as a second merge place MP2. In the present embodiment, the pressure loss from the inlet side of the second interior evaporator 24 to the second merge place MP2 is defined as $\Delta PP1$, and the pressure loss from the inlet side of the second equipment evaporator 26 to the second merge place MP2 is defined as $\Delta PP2$.

The door side air conditioner 10X is provided, on the outlet side of the first equipment evaporator 16, with the pressure loss body 19 that obstructs the flow of the refrigerant. As a result, the pressure loss $\Delta PD2$ from the inlet side of the first equipment evaporator 16 to the first merge place MP1 increases. Therefore, in the air conditioning system 1, a first pressure loss ratio $\Delta PD$ that is a ratio of the pressure loss $\Delta PD2$ to the pressure loss $\Delta PD1$ is larger than a second pressure loss ratio $\Delta PP$ that is a ratio of the pressure loss $\Delta PP2$ to the pressure loss $\Delta PP1$, as illustrated in FIG. 37.

Other configurations are the same as those of the fourth embodiment. The air conditioning system 1 of the present embodiment can obtain effects exerted from a configuration common to or equivalent to that of the fourth embodiment, similarly to the fourth embodiment.

In the present embodiment, the first pressure loss ratio $\Delta PD$ is particularly larger than the second pressure loss ratio $\Delta PP$. According to this, the refrigerant is less likely to flow to the first equipment evaporator 16 and is likely to flow to the first interior evaporator 14 during the equipment temperature control. Therefore, a configuration, in which the amount of the heat absorbed from the heat medium during the equipment temperature control is smaller in the first equipment evaporator 16 than in the second equipment evaporator 26, can be easily realized by adjusting the pressure loss in the refrigeration cycle of each of the air conditioners 10X and 20X.

Modification of Eighth Embodiment

In the eighth embodiment, what realizes a structure in which the pressure loss $\Delta PD2$ is increased by adding the pressure loss body 19 to the outlet side of the first equipment evaporator 16 has been described as an example. However, the structure may be realized by other means. The above structure may be realized by, for example, making the bending angle of the refrigerant pipe on the outlet side of the first equipment evaporator 16 larger than the bending angle of the refrigerant pipe on the outlet side of the second equipment evaporator 26. Alternatively, the above structure may be realized by, for example, making the curvature radius of the arc-shaped bent portion in the refrigerant pipe on the outlet side of the first equipment evaporator 16 smaller than the curvature radius of the bent portion in the refrigerant pipe on the outlet side of the second equipment evaporator 26. Furthermore, the above structure may be realized by, for example, making the effective length L/D in the refrigerant pipe on the outlet side of the first equipment evaporator 16 larger than the effective length L/D in the refrigerant pipe on the outlet side of the second equipment evaporator 26.

Figure 38:
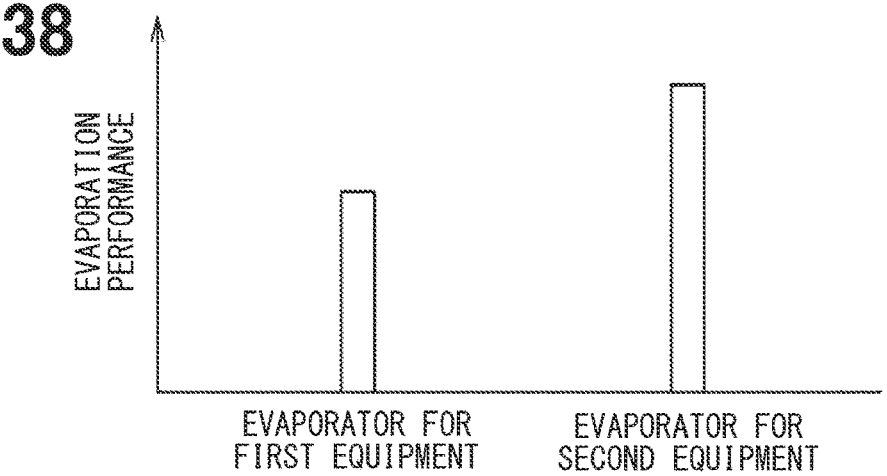
FIG. 38 is an explanatory diagram for explaining a modification of the eighth embodiment.

Here, the configuration, in which the amount of the heat absorbed from the heat medium during the equipment temperature control is smaller in the first equipment evaporator 16 than in the second equipment evaporator 26, can also be realized by lowering the evaporation performance of the first equipment evaporator 16 more than that of the second equipment evaporator 26, as illustrated in FIG. 38. Such a configuration can be realized by making the size of the first equipment evaporator 16 larger or a fin pitch between inner fins smaller than that of the second equipment evaporator 26.

In addition, the configuration described in the eighth embodiment can also be applied to the air conditioning systems 1 described in the fifth embodiment and the sixth embodiment without being limited to that of the fourth embodiment.

Other Embodiments

Although the representative embodiments of the present disclosure have been described above, the present disclosure is not limited to the above embodiments, and can be variously modified, for example, as follows.

Although the first radiator 12 and the second radiator 22 of the above embodiments respectively include the liquid receiving units 122 and 222 and the subcooling portions 123 and 223. However, without being limited thereto, the liquid receiving units 122 and 222 and the subcooling portions 123 and 223 may not be included.

In the door side air conditioner 10X of the above embodiments, the first interior evaporator 14 and the first equipment evaporator 16 are connected in parallel with respect to the refrigerant flow. However, without being limited thereto, the first interior evaporator 14 and the first equipment evaporator 16 may be connected in series with respect to the refrigerant flow. The first cabin side on-off valve 17 provided in the door side air conditioner 10X is not essential.

In the panel side air conditioner 20 of the above embodiments, the second interior evaporator 24 and the second equipment evaporator 26 are connected in parallel with respect to the refrigerant flow. However, without being limited thereto, the second interior evaporator 24 and the second equipment evaporator 26 may be connected, for example, in series with respect to the refrigerant flow. The second cabin side on-off valve 27 provided in the panel side air conditioner 20 is not essential.

In the above embodiments, what cools the battery BT as the target equipment has been described as an example. However, without being limited thereto, the air conditioning system 1 may be configured to cool in-vehicle equipment of the battery BT as the target equipment. The in-vehicle equipment in this case is not limited to heat generating equipment that self-heats, and includes equipment that raises temperature by receiving heat from the outside.

In the above embodiments, the operation modes of the air conditioning system 1 have been exemplified by the interior cooling and the equipment temperature control. However, the operation modes are not limited thereto, and may include, for example, a mode for performing interior heating, a mode for performing temperature control of only the battery BT, and the like.

In the above embodiments, the vehicle in which two air conditioning zones Z are set in the interior, the vehicle in which four air conditioning zones Z are set, and the vehicle in which six air conditioning zones Z are set have been described as examples. However, the vehicle air conditioning system of the present disclosure can be applied to a vehicle in which a plurality of the air conditioning zones Z, other than the above numbers, are set.

In the above embodiments, the bus vehicle V configured as an electric car has been described as an example. However, the bus vehicle V may be configured as a hybrid car.

In the above embodiments, an example has been described in which the vehicle air conditioning system of the present disclosure is applied to the bus vehicle V. However, the vehicle air conditioning system of the present disclosure can be applied to a vehicle in which doors are provided to be biased to any one of the front, rear, left, and right, without being limited to the bus vehicle V. The "door" described in the above embodiments is not limited to a passenger door for a passenger to get on and off, but also includes a door for mainly loading and unloading baggage, such as a back door.

In the respective embodiments above, it goes without saying that elements forming the embodiments are not necessarily essential unless specified as being essential or deemed as being apparently essential in principle.

In a case where a reference is made to the components of the respective embodiments as to numerical values, such as the number, values, amounts, and ranges, the components are not limited to the numerical values unless specified as being essential or deemed as being apparently essential in principle.

Also, in a case where a reference is made to the components of the respective embodiments above as to shapes and positional relations, the components are not limited to the shapes and the positional relations unless explicitly specified or limited to particular shapes and positional relations in principle.

The control circuit and method described in the present disclosure may be implemented by a special purpose computer which is configured with a memory and a processor programmed to execute one or more particular functions embodied in computer programs of the memory. Alternatively, the control unit and the method thereof described in the present disclosure may be implemented by a dedicated computer provided by including a processor with one or more dedicated hardware logic circuits. The control units and techniques described in this disclosure comprise a combination of a processor and memory programmed to perform one or more functions and a processor configured by one or more hardware logic circuits. It may also be implemented on one or more dedicated computers. The computer program may be stored in a computer-readable non-transition tangible recording medium as an instruction executed by a computer.

Overview

According to a first point of view described in part or all of the above embodiments, the vehicle air conditioning system includes a plurality of air conditioners provided to respectively correspond to a plurality of air conditioning zones, and a cooler that cools target equipment mounted on a vehicle. The plurality of air conditioners include a door side air conditioner and a panel side air conditioner, and are configured such that the amount of the heat absorbed from a heat medium during equipment temperature control is smaller in the door side air conditioner than in the panel side air conditioner.

According to a second point of view, the door side air conditioner includes a first interior evaporator that absorbs heat from the air before blowing out to the panel side zone to evaporate a refrigerant, and does not include a heat absorber that absorbs heat from the heat medium. The panel side air conditioner includes a second interior evaporator that absorbs heat from the air before blowing out to the door side zone to evaporate the refrigerant, and includes an equipment evaporator that is provided in parallel to the second interior evaporator with respect to the refrigerant flow and absorbs heat from the heat medium to evaporate the refrigerant.

According to this, the door side air conditioner is not configured to absorb heat from the heat medium, unlike the panel side air conditioner, so that an endothermic action of a refrigeration cycle can be concentrated on the air blowing out to the door side zone. Therefore, it is possible to sufficiently ensure comfort in the air conditioning zone near the door of the vehicle.

According to a third point of view, the door side air conditioner includes the first interior evaporator that absorbs heat from the air before blowing out to the door side zone to evaporate the refrigerant, and includes a first equipment evaporator that is provided in parallel to the first interior evaporator with respect to the refrigerant flow and absorbs heat from the heat medium to evaporate the refrigerant. The panel side air conditioner includes the second interior evaporator that absorbs heat from the air before blowing out to the panel side zone to evaporate the refrigerant, and includes a second equipment evaporator that is provided in parallel to the second interior evaporator with respect to the refrigerant flow and absorbs heat from the heat medium to evaporate the refrigerant. The amount of the heat absorbed from the heat medium during the equipment temperature control is smaller in the first equipment evaporator than in the second equipment evaporator.

According to this, the amount of the heat absorbed from the heat medium is smaller in the door side air conditioner than in the panel side air conditioner, so that the endothermic action of the refrigeration cycle can be concentrated on the air blowing out to the door side zone. Therefore, it is possible to sufficiently ensure comfort in the air conditioning zone near the door of the vehicle.

According to a fourth point of view, the first equipment evaporator and the second equipment evaporator are disposed, in a cooling circuit, in series with respect to the heat medium flow. The first equipment evaporator is disposed on the downstream side, in the heat medium flow, of the second equipment evaporator in the cooling circuit such that the heat medium having passed through the second equipment evaporator flows into the first equipment evaporator.

Since the heat medium having a lower temperature than that of the heat medium flowing into the second equipment evaporator flows into the first equipment evaporator, a temperature difference between the temperatures of the heat medium before and after the evaporator becomes smaller in the first equipment evaporator than in the second equipment evaporator. Therefore, a configuration, in which the amount of the heat absorbed from the heat medium during the equipment temperature control is smaller in the first equipment evaporator than in the second equipment evaporator, can be easily realized by disposing the first equipment evaporator on the downstream side, in the heat medium flow, of the second equipment evaporator.

According to a fifth point of view, the first equipment evaporator and the second equipment evaporator are disposed, in the cooling circuit, in parallel with respect to the heat medium flow. The cooling circuit includes a first cooling pipe that allows the heat medium to flow toward the first equipment evaporator and a second cooling pipe that allows the heat medium to flow toward the second equipment evaporator. One-end sides of the first cooling pipe and the second cooling pipe are connected to a branch portion provided on the upstream sides, in the heat medium flow, of the first equipment evaporator and the second equipment evaporator, and the other-end sides are connected to a merge portion provided on the downstream sides, in the heat medium flow, of the first equipment evaporator and the second equipment evaporator. The first cooling pipe has a structure in which a pressure loss, occurring when the heat medium flows, is larger than that of the second cooling pipe.

In the first cooling pipe configured as described above, the flow rate of the heat medium is smaller than that of the second cooling pipe. As a result, the amount of the heat absorbed from the heat medium is smaller in the first equipment evaporator than in the second equipment evaporator. Therefore, a configuration, in which the amount of the heat absorbed from the heat medium during the equipment temperature control is smaller in the first equipment evaporator than in the second equipment evaporator, can be easily realized by adjusting the pressure loss in the first cooling pipe.

Here, a bending angle of a bent portion of the pipe may be larger in the second cooling pipe than in the first cooling pipe. A curvature radius of an arc-shaped bent portion may be smaller in the second cooling pipe than in the first cooling pipe. An effective length indicated as a ratio of a pipe length to a pipe inner diameter may be larger in the second cooling pipe than in the first cooling pipe. The second cooling pipe may be provided with a resistor that obstructs the flow of the heat medium so as to have a larger pressure loss than the first cooling pipe.

According to a sixth point of view, the cooling circuit includes a first circuit unit and a second circuit unit that are independent of each other. The first equipment evaporator is disposed in the first circuit unit such that the heat medium flowing in the first circuit unit passes therethrough. The second equipment evaporator is disposed in the second circuit unit such that the heat medium flowing in the second circuit unit passes therethrough.

The cooling circuit may be configured such that the amount of the heat absorbed from the heat medium in the first equipment evaporator and the amount of the heat absorbed from the heat medium in the second equipment evaporator can be independently adjusted, as described above.

According to a seventh point of view, the target equipment includes ceiling side equipment disposed in a ceiling portion of the vehicle and underfloor side equipment disposed in an underfloor portion of the vehicle. In the first circuit unit, the heat medium for exchanging heat with the underfloor side equipment flows. In the second circuit unit, the heat medium for exchanging heat with the ceiling side equipment flows.

In the vehicle, the temperature of the ceiling side equipment is likely to be higher than that of the underfloor side equipment due to the influence of solar radiation, natural convection, and the like. In other words, the temperature of the underfloor side equipment is less likely to be higher than that of the ceiling side equipment due to the influence of solar radiation, natural convection, and the like. Therefore, when the cooling circuit has a circuit configuration in which the heat medium for exchanging heat with the underfloor side equipment flows in the first circuit unit and the heat medium for exchanging heat with the ceiling side equipment flows in the second circuit unit, the heat medium having a lower temperature than that of the heat medium flowing into the second equipment evaporator flows into the first equipment evaporator. As a result, a temperature difference between the temperatures of the heat medium before and after the evaporator is smaller in the first equipment evaporator than in the second equipment evaporator. Therefore, it is possible to realize a configuration in which the amount of the heat absorbed from the heat medium during the equipment temperature control is smaller in the first equipment evaporator than in the second equipment evaporator.

According to an eighth point of view, the ceiling side equipment has a larger heat capacity than the underfloor side equipment. According to this, the temperature of the underfloor side equipment is likely to be lower than that of the ceiling side equipment. As a result, during the equipment cooling, the heat medium having a lower temperature than that of the heat medium flowing into the second equipment evaporator is likely to flow into the first equipment evaporator. As a result, a temperature difference between the temperatures of the heat medium before and after the evaporator is smaller in the first equipment evaporator than in the second equipment evaporator. Therefore, it is possible to realize a configuration in which the amount of the heat absorbed from the heat medium during the equipment temperature control is smaller in the first equipment evaporator than in the second equipment evaporator.

According to a ninth point of view, the target equipment includes a plurality of pieces of equipment. The cooling circuit is configured such that the number of pieces of equipment that are allowed to exchange heat with the heat medium is smaller in the first circuit unit than in the second circuit unit.

According to this, the first circuit unit has a smaller number of pieces of equipment to be cooled, and the temperature of the heat medium in the first circuit unit is likely to be lower than that in the second circuit unit. As a result, during the equipment cooling, the heat medium having a lower temperature than that of the heat medium flowing into the second equipment evaporator is likely to flow into the first equipment evaporator. As a result, a temperature difference between the temperatures of the heat medium before and after the evaporator is smaller in the first equipment evaporator than in the second equipment evaporator. Therefore, it is possible to realize a configuration in which the amount of the heat absorbed from the heat medium during the equipment temperature control is smaller in the first equipment evaporator than in the second equipment evaporator.

According to a tenth point of view, the vehicle air conditioning system includes an air conditioning control unit that controls the door side air conditioner and the panel side air conditioner. The door side air conditioner includes a door side switching unit that switches between a first permitted state of permitting the flow of the refrigerant to the first equipment evaporator and a first blocked state of blocking the flow of the refrigerant to the first equipment evaporator. The panel side air conditioner includes a panel side switching unit that switches between a second permitted state of permitting the flow of the refrigerant to the second equipment evaporator and a second blocked state of blocking the flow of the refrigerant to the second equipment evaporator. The air conditioning control unit controls the door side switching unit and the panel side switching unit such that, during the equipment temperature control, a time during which the first permitted state is maintained is shorter than a time during which the second permitted state is maintained.

According to this, the flow rate of the refrigerant during the equipment temperature control is smaller in the first equipment evaporator than in the second equipment evaporator. As a result, the amount of the heat absorbed from the heat medium during the equipment temperature control can be made smaller in the second equipment evaporator than in the first equipment evaporator.

According to an eleventh point of view, the air conditioning control unit controls the door side switching unit and the panel side switching unit such that when the equipment temperature control is started, the first blocked state is switched to the first permitted state after a predetermined time elapses since the second blocked state is switched to the second permitted state.

According to this, a configuration, in which the amount of the heat absorbed from the heat medium during the equipment temperature control is smaller in the first equipment evaporator than in the second equipment evaporator, can be easily realized by changing the control modes of the door side switching unit and the panel side switching unit when the equipment temperature control is started.

According to a twelfth point of view, the air conditioning control unit controls the door side switching unit and the panel side switching unit such that when the equipment temperature control is stopped, the second permitted state is switched to the second blocked state after a predetermined time elapses since the first permitted state is switched to the first blocked state.

According to this, a configuration, in which the amount of the heat absorbed from the heat medium during the equipment temperature control is smaller in the first equipment evaporator than in the second equipment evaporator, can be easily realized by changing the control modes of the door side switching unit and the panel side switching unit when the equipment temperature control is stopped.

According to a thirteenth point of view, a first pressure loss ratio is larger than a second pressure loss ratio. Here, the first pressure loss ratio is a ratio of the pressure loss from the refrigerant inlet side of the first equipment evaporator to a first merge place to the pressure loss from the refrigerant inlet side of the first interior evaporator to the first merge place. The first merge place is a merge place where the refrigerant having passed through the first interior evaporator and the refrigerant having passed through the first equipment evaporator are merged. The second pressure loss is a ratio of the pressure loss from the refrigerant inlet side of the second equipment evaporator to a second merge place to the pressure loss from the refrigerant inlet side of the second interior evaporator to the second merge place. The second merge place is a merge place where the refrigerant having passed through the second interior evaporator and the refrigerant having passed through the second equipment evaporator are merged.

According to this, the refrigerant is less likely to flow to the first equipment evaporator and is likely to flow to the first interior evaporator during the equipment temperature control. Therefore, a configuration, in which the amount of the heat absorbed from the heat medium during the equipment temperature control is smaller in the first equipment evaporator than in the second equipment evaporator, can be easily realized by adjusting the pressure loss in the refrigeration cycle of each of the air conditioners.

According to a fourteenth point of view, the target equipment is heat generating equipment mounted on the vehicle. According to this, the heat generating equipment can be cooled while comfort in an air conditioning zone away from the door of the vehicle is ensured.

According to a fifteenth point of view, the door is a passenger door that opens and closes a platform when a passenger of the vehicle gets on and off. According to the vehicle air conditioning system of the present disclosure, it is possible to ensure comfort in an air conditioning zone that cannot be ventilated due to opening and closing of the passenger door.

Here, in the vehicle, one or more doors may be provided on the side surface on one side in the left-right direction of the vehicle, a side panel may be provided on the side surface on the other side in the left-right direction, the one side in the left-right direction of the interior may be the door side zone, and the other side in the left-right direction of the interior may be the panel side zone.

Alternatively, in the vehicle, one or more doors may be provided on the front side of the side surface on one side in the left-right direction of the vehicle, and side panels may be provided on the rear side of the side surface on the one side in the left-right direction and the side surface on the other side in the left-right direction. In this case, it is desirable in the vehicle that the front side on the one side in the left-right direction of the interior is the door side zone, and the rear side on the one side in the left-right direction of the interior and the other side in the left-right direction are the panel side zone.

Alternatively, in the vehicle, one or more doors may be provided on the rear side of the side surface on one side in the left-right direction of the vehicle, and side panels may be provided on the front side of the side surface on the one side in the left-right direction and the side surface on the other side in the left-right direction. In this case, it is desirable in the vehicle that the rear side on the one side in the left-right direction of the interior is the door side zone, and the front side on the one side in the left-right direction of the interior and the other side in the left-right direction are the panel side zone.

Alternatively, in the vehicle, one or more doors may be provided on the front sides of both side surfaces in the left-right direction of the vehicle, side panels may be provided on the rear sides, the front side of the interior may be the door side zone, and the rear side of the interior may be the panel side zone.

Alternatively, in the vehicle, one or more doors may be provided on the rear sides of both side surfaces in the left-right direction of the vehicle, side panels may be provided on the front sides, the rear side of the interior may be the door side zone, and the front side of the interior may be the panel side zone.

What is claimed is:

1. A vehicle air conditioning system for air conditioning a plurality of air conditioning zones set in an interior of a vehicle, the vehicle air conditioning system comprising:
   a plurality of air conditioners provided to respectively correspond to the plurality of air conditioning zones; and
   a cooler that cools a target equipment mounted on the vehicle, wherein
   each of the plurality of air conditioners includes vapor compression refrigeration cycle, and cools air blowing out to the plurality of air conditioning zones by an endothermic action due to evaporation of a refrigerant,
   the cooler includes a cooling circuit through which a heat medium for exchanging heat with the target equipment flows, and adjusts a temperature of the target equipment by cooling the heat medium utilizing the endothermic action in at least a part of the plurality of air conditioners,
   of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during an equipment temperature control, in which cooling of the interior and temperature control of the target equipment are respectively performed by the plurality of air conditioners, is smaller in the door side air conditioner than in the panel side air conditioner,
   the door side air conditioner includes a first interior evaporator that absorbs heat from air before blowing out to the door side zone to evaporate the refrigerant, and a first equipment evaporator that is provided in parallel to the first interior evaporator with respect to a flow of the refrigerant and absorbs heat from the heat medium to evaporate the refrigerant,
   the panel side air conditioner includes a second interior evaporator that absorbs heat from air before blowing out to the panel side zone to evaporate the refrigerant, and a second equipment evaporator that is provided in parallel to the second interior evaporator with respect to the flow of the refrigerant and absorbs heat from the heat medium to evaporate the refrigerant,
   an amount of heat absorbed from the heat medium during the equipment temperature control is smaller in the first equipment evaporator than in the second equipment evaporator,
   the first equipment evaporator and the second equipment evaporator are disposed, in the cooling circuit, in parallel with respect to the flow of heat medium,
   the cooling circuit includes a first cooling pipe that allows the heat medium to flow toward the first equipment evaporator and a second cooling pipe that allows the heat medium to flow toward the second equipment evaporator,
   one-end sides of the first cooling pipe and the second cooling pipe are connected to a branch portion provided on an upstream side, in the flow of heat medium, of each of the first equipment evaporator and the second equipment evaporator, and the other-end sides are connected to a merge portion provided on a downstream side, in the flow of heat medium, of each of the first equipment evaporator and the second equipment evaporator, and
   the first cooling pipe is configured such that a pressure loss, occurring when the heat medium flows in the first cooling pipe, is larger than a pressure loss in the second cooling pipe.

2. The vehicle air conditioning system according to claim 1, wherein
   the cooling circuit includes a first circuit unit and a second circuit unit that are independent of each other,
   the first equipment evaporator is disposed in the first circuit unit such that the heat medium flowing in the first circuit unit passes through the first equipment evaporator, and
   the second equipment evaporator is disposed in the second circuit unit such that the heat medium flowing in the second circuit unit passes through the second equipment evaporator.

3. The vehicle air conditioning system according to claim 2, wherein
the target equipment includes a ceiling side equipment disposed in a ceiling portion of the vehicle and an underfloor side equipment disposed in an underfloor portion of the vehicle,
the heat medium for exchanging heat with the underfloor side equipment flows through the first circuit unit, and
the heat medium for exchanging heat with the ceiling side equipment flows through the second circuit unit.

4. The vehicle air conditioning system according to claim 3, wherein the ceiling side equipment has a larger heat capacity than the underfloor side equipment.

5. The vehicle air conditioning system according to claim 2, wherein
the target equipment includes a plurality of pieces of equipment, and
the cooling circuit is configured such that the plurality of pieces of equipment that are allowed to exchange heat with the heat medium is smaller in the first circuit unit than in the second circuit unit.

6. The vehicle air conditioning system according to claim 1, wherein the target equipment is a heat generating equipment mounted on the vehicle.

7. The vehicle air conditioning system according to claim 1, wherein the door is a passenger door that opens and closes a platform when a passenger of the vehicle gets on and off the vehicle.

8. A vehicle air conditioning system for air conditioning a plurality of air conditioning zones set in an interior of a vehicle, the vehicle air conditioning system comprising:
a plurality of air conditioners provided to respectively correspond to the plurality of air conditioning zones; and
a cooler that cools a target equipment mounted on the vehicle, wherein
each of the plurality of air conditioners includes vapor compression refrigeration cycle, and cools air blowing out to the plurality of air conditioning zones by an endothermic action due to evaporation of a refrigerant,
the cooler includes a cooling circuit through which a heat medium for exchanging heat with the target equipment flows, and adjusts a temperature of the target equipment by cooling the heat medium utilizing the endothermic action in at least a part of the plurality of air conditioners,
of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during an equipment temperature control, in which cooling of the interior and temperature control of the target equipment are respectively performed by the plurality of air conditioners, is smaller in the door side air conditioner than in the panel side air conditioner,
the door side air conditioner includes a first interior evaporator that absorbs heat from air before blowing out to the door side zone to evaporate the refrigerant, and a first equipment evaporator that is provided in parallel to the first interior evaporator with respect to a flow of the refrigerant and absorbs heat from the heat medium to evaporate the refrigerant,
the panel side air conditioner includes a second interior evaporator that absorbs heat from air before blowing out to the panel side zone to evaporate the refrigerant, and a second equipment evaporator that is provided in parallel to the second interior evaporator with respect to the flow of the refrigerant and absorbs heat from the heat medium to evaporate the refrigerant, and
an amount of heat absorbed from the heat medium during the equipment temperature control is smaller in the first equipment evaporator than in the second equipment evaporator,
the vehicle air conditioning system further comprising an air conditioning control unit that controls the door side air conditioner and the panel side air conditioner, wherein
the door side air conditioner includes a door side switching unit that switches between a first permitted state of permitting a flow of the refrigerant to the first equipment evaporator and a first blocked state of blocking the flow of the refrigerant to the first equipment evaporator,
the panel side air conditioner includes a panel side switching unit that switches between a second permitted state of permitting a flow of the refrigerant to the second equipment evaporator and a second blocked state of blocking the flow of the refrigerant to the second equipment evaporator, and
the air conditioning control unit controls the door side switching unit and the panel side switching unit such that, during the equipment temperature control, a time during which the first permitted state is maintained is shorter than a time during which the second permitted state is maintained.

9. The vehicle air conditioning system according to claim 8, wherein the air conditioning control unit controls the door side switching unit and the panel side switching unit such that, when the equipment temperature control is started, the first blocked state is switched to the first permitted state after a predetermined time elapses since the second blocked state is switched to the second permitted state.

10. The vehicle air conditioning system according to claim 8, wherein the air conditioning control unit controls the door side switching unit and the panel side switching unit such that when the equipment temperature control is stopped, the second permitted state is switched to the second blocked state after a predetermined time elapses since the first permitted state is switched to the first blocked state.

11. A vehicle air conditioning system for air conditioning a plurality of air conditioning zones set in an interior of a vehicle, the vehicle air conditioning system comprising:
a plurality of air conditioners provided to respectively correspond to the plurality of air conditioning zones; and
a cooler that cools a target equipment mounted on the vehicle, wherein
each of the plurality of air conditioners includes vapor compression refrigeration cycle, and cools air blowing out to the plurality of air conditioning zones by an endothermic action due to evaporation of a refrigerant,
the cooler includes a cooling circuit through which a heat medium for exchanging heat with the target equipment flows, and adjusts a temperature of the target equipment by cooling the heat medium utilizing the endothermic action in at least a part of the plurality of air conditioners,
of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during an equipment temperature control, in which cooling of the interior and temperature control of the target equipment are respectively performed by the plurality of air conditioners, is smaller in the door side air conditioner than in the panel side air conditioner, the door side air conditioner includes a first interior evaporator that absorbs heat from air before blowing out to the door side zone to evaporate the refrigerant, and a first equipment evaporator that is provided in parallel to the first interior evaporator with respect to a flow of the refrigerant and absorbs heat from the heat medium to evaporate the refrigerant, the panel side air conditioner includes a second interior evaporator that absorbs heat from air before blowing out to the panel side zone to evaporate the refrigerant, and a second equipment evaporator that is provided in parallel to the second interior evaporator with respect to the flow of the refrigerant and absorbs heat from the heat medium to evaporate the refrigerant, an amount of heat absorbed from the heat medium during the equipment temperature control is smaller in the first equipment evaporator than in the second equipment evaporator, the first equipment evaporator and the second equipment evaporator are disposed, in the cooling circuit, in series with respect to a flow of heat medium, and the first equipment evaporator is disposed, in the cooling circuit, on a downstream side, in the flow of heat medium, of the second equipment evaporator such that the heat medium having passed through the second equipment evaporator flows into the first equipment evaporator.

12. A vehicle air conditioning system for air conditioning a plurality of air conditioning zones set in an interior of a vehicle, the vehicle air conditioning system comprising:

a plurality of air conditioners provided to respectively correspond to the plurality of air conditioning zones; and a cooler that cools a target equipment mounted on the vehicle, wherein each of the plurality of air conditioners includes vapor compression refrigeration cycle, and cools air blowing out to the plurality of air conditioning zones by an endothermic action due to evaporation of a refrigerant, the cooler includes a cooling circuit through which a heat medium for exchanging heat with the target equipment flows, and adjusts a temperature of the target equipment by cooling the heat medium utilizing the endothermic action in at least a part of the plurality of air conditioners, of the plurality of air conditioners, the air conditioner that air-conditions a door side zone separated from an outside by a door of the vehicle is a door side air conditioner and the air conditioner that air-conditions a panel side zone separated from the outside by a side panel of the vehicle is a panel side air conditioner, an amount of heat absorbed from the heat medium during an equipment temperature control, in which cooling of the interior and temperature control of the target equipment are respectively performed by the plurality of air conditioners, is smaller in the door side air conditioner than in the panel side air conditioner, the door side air conditioner includes a first interior evaporator that absorbs heat from air before blowing out to the door side zone to evaporate the refrigerant, and a first equipment evaporator that is provided in parallel to the first interior evaporator with respect to a flow of the refrigerant and absorbs heat from the heat medium to evaporate the refrigerant, the panel side air conditioner includes a second interior evaporator that absorbs heat from air before blowing out to the panel side zone to evaporate the refrigerant, and a second equipment evaporator that is provided in parallel to the second interior evaporator with respect to the flow of the refrigerant and absorbs heat from the heat medium to evaporate the refrigerant, an amount of heat absorbed from the heat medium during the equipment temperature control is smaller in the first equipment evaporator than in the second equipment evaporator, a first merge place is a merge place where the refrigerant having passed through the first interior evaporator and the refrigerant having passed through the first equipment evaporator are merged, and a second merge place is a merge place where the refrigerant having passed through the second interior evaporator and the refrigerant having passed through the second equipment evaporator are merged, and a first pressure loss ratio, which is a ratio of a pressure loss from a refrigerant inlet side of the first equipment evaporator to the first merge place to a pressure loss from a refrigerant inlet side of the first interior evaporator to the first merge place, is larger than a second pressure loss ratio, which is a ratio of a pressure loss from a refrigerant inlet side of the second equipment evaporator to the second merge place to a pressure loss from a refrigerant inlet side of the second interior evaporator to the second merge place.

* * * * *